United States Patent
Tabassi et al.

(10) Patent No.: US 7,347,684 B2
(45) Date of Patent: Mar. 25, 2008

(54) ADJUSTABLE VALVE PIN ACTUATOR FOR AN INJECTION MOLDING APPARATUS

(75) Inventors: Payman Tabassi, Rockwood (CA); Denis Babin, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 258 days.

(21) Appl. No.: 11/237,886

(22) Filed: Sep. 29, 2005

(65) Prior Publication Data

US 2006/0065991 A1 Mar. 30, 2006

Related U.S. Application Data

(60) Provisional application No. 60/614,013, filed on Sep. 29, 2004, provisional application No. 60/619,038, filed on Oct. 18, 2004.

(51) Int. Cl.
B29C 45/23 (2006.01)
(52) U.S. Cl. ..................................................... 425/564
(58) Field of Classification Search ................ 425/562, 425/563, 564, 565, 566
See application file for complete search history.

(56) References Cited

U.S. PATENT DOCUMENTS

| | | | |
|---|---|---|---|
| 3,553,788 A | 1/1971 | Putkowski | |
| 4,088,271 A | 5/1978 | Flygenring | |
| 4,468,191 A | 8/1984 | Gellert | |
| 5,067,893 A * | 11/1991 | Osuna-Diaz | 425/564 |
| 5,078,589 A | 1/1992 | Osuna-Diaz | |
| 5,080,575 A | 1/1992 | Berg et al. | |
| 5,334,010 A | 8/1994 | Teng | |
| 5,368,470 A | 11/1994 | Manner | |
| 5,635,227 A | 6/1997 | Whisenhunt et al. | |
| 5,660,369 A | 8/1997 | Gauler | |
| 5,894,025 A | 4/1999 | Lee et al. | |
| 6,183,239 B1 | 2/2001 | Belous | |
| 6,419,870 B1 | 7/2002 | Lee et al. | |
| 2004/0032059 A1 | 2/2004 | Babin et al. | |

FOREIGN PATENT DOCUMENTS

DE 3336203 4/1985

(Continued)

OTHER PUBLICATIONS

HRS Flow HotRunner Technology document entitled "Adjustable Cylinder" (dated Aug. 20, 2004).

(Continued)

Primary Examiner—Tim Heitbrink
(74) Attorney, Agent, or Firm—Ridout & Maybee LLP

(57) ABSTRACT

An actuator for a valve pin of an injection molding apparatus includes an adjustment piece coupled to a valve pin via a connector and axially movable relative to a piston to adjust an axial position of the valve pin relative to a mold gate. A removable locking device restricts axial movement of the adjustment piece with respect to the piston. An indicator is provided for determining the position of the valve pin relative to a mold gate based on the position of the adjustment piece with respect to the piston. An anti-rotation device is provided to inhibit rotational movement of the valve pin. During maintenance, the actuator piston and adjustment piece may be extracted with or without the valve pin. The actuator may be reassembled with correct axial position via the piston/adjustment piece relationship and correct rotational position of the valve pin via the anti-rotation device.

25 Claims, 27 Drawing Sheets

FOREIGN PATENT DOCUMENTS

| | | |
|---|---|---|
| DE | 4300334 | 7/1993 |
| DE | 19608676 | 1/1997 |
| DE | 19611880 | 10/1997 |
| EP | 0635350 A1 | 1/1995 |
| EP | 0635350 B1 | 10/1997 |

OTHER PUBLICATIONS

Five (5) photographs of piston sample from Weber-Formenbau first shown at Fakuma Show held on Oct. 14, 2003 in Friedrichshafen, Germany.

* cited by examiner

ADJUSTABLE VALVE PIN ACTUATOR FOR AN INJECTION MOLDING APPARATUS

This application claims the benefit of U.S. Provisional Application No. 60/614,013 filed Sep. 29, 2004 and U.S. Provisional Application No. 60/619,038 filed Oct. 18, 2004.

BACKGROUND OF THE INVENTION

1. Field of the Invention

The present invention relates generally to an injection molding apparatus and, in particular to an adjustable valve pin actuator.

2. Background Art

In an injection molding apparatus, at least one hot runner nozzle delivers melt to a mold cavity through a mold gate. Valve pins are well known in the art for use in controlling the flow of melt through mold gates. Valve pins are often controlled by actuators, which advance or retract the valve pins either to close or open the mold gates, respectively, or to vary the flow to mold cavities.

In most valve-gated applications, a valve pin is controlled by an actuator, which advances and retracts the valve pin. Proper seating of the valve pin in the mold gate is necessary in order to prevent plastic melt from leaking or stringing and to prevent gate flash when the valve pin is advanced to shut off the flow from the melt into the mold cavity. Due to differences in the molding conditions and machining tolerances at each mold cavity, a valve pin for a particular cavity may require a longitudinal axial adjustment so that the valve pin will properly seat in the mold gate. If the valve pin is too long, an operator must remove the valve pin assembly, machine the valve pin to adjust the length, and re-insert the valve pin assembly into the machine. If the pin is still too long, the procedure must be repeated again. If the valve pin is too short, the valve pin must be replaced and subsequently machined to size. This procedure is cumbersome, time consuming, and results in lost production time for the manufacture. In addition, inserting and removing the valve pin repeatedly may cause damage to the valve pin.

Further, each valve pin is machined for a particular actuator and mold gate assembly and is not interchangeable. During regular maintenance, actuator components are disassembled and valve pins may become mixed up. Regular maintenance also often requires the dissembling of all components of an actuator including the extraction of the valve pin. In addition to the potential damage that may occur upon removing and inserting the valve pin, the valve pin length will have to be reassessed upon reassembling the actuator components. Thus, such labor intensive regular maintenance adds time and expense which is undesirable in mass production industries such as injection molding.

Another method an operator may use to adjust the axial position of the valve pin is to insert one or more spacers into a cylinder or attached to a piston to limit the course of travel of the piston. If the piston is prevented from extending the valve pin over the entire course of travel of the piston movement, it will create the effect of a shortened valve pin. Similarly, if the piston is prevented from retracting the valve pin over the course of travel of the piston, it creates the effect of a longer valve pin. While inserting spacers is easier than machining the valve pin, it is inaccurate, in that the fineness of the adjustment is limited by the thinness of the spacer. Further, the actuator must be almost entirely disassembled to insert the spacers.

Removing and reinserting a valve pin during actuator maintenance can cause damage to the valve pin. Further, when a valve pin is replaced after actuator maintenance, misalignment of the valve pin and damage may occur if it has been rotated and is not in the same rotational position as before it was removed.

BRIEF SUMMARY OF THE INVENTION

One aspect of the present invention is an injection molding apparatus including a manifold having a manifold melt channel, a nozzle having a nozzle melt channel in communication with the manifold melt channel, a mold cavity having a mold gate in communication with the nozzle melt channel of the nozzle, a valve pin extending through the nozzle channel and slidably insertable into the mold gate, and a valve pin actuator. The valve pin actuator includes a piston and an adjustment piece. The adjustment piece is coupled to the piston so as to be capable of axial movement with respect to the piston and coupled to the valve pin via a connector. The actuator also includes an anti-rotation device capable of inhibiting rotational movement of the valve pin, the connector and the adjustment piece, an indicator capable of measuring the axial movement of the adjustment piece with respect to the piston, and a locking device capable of holding the adjustment piece in a fixed position with respect to the piston. The locking device is selectively removable from the actuator.

Another aspect of the present invention is a method of adjusting an axial position of a valve pin of an injection molding apparatus including the step of providing an actuator having a piston and an adjustment piece being capable of axial movement with respect to a piston and coupled to the valve pin. Another step includes preventing rotational movement of the adjustment piece and the valve pin by providing an anti-rotation device. Another step includes providing an indicator on the piston capable of measuring the axial movement of the adjustment piece with respect of the piston. Another step includes allowing the valve pin to move with respect to the piston by removing a locking device from the valve pin actuator. Another step includes rotating the piston to move the adjustment piece relative to the piston a predetermined distance and measuring the predetermined distance via the indicator. Another step includes restricting movement of the adjustment piece with respect to the piston by replacing the locking device.

Another aspect of the present invention is a method for disassembling a valve pin actuator of an injection molding apparatus and includes the steps of providing a valve pin actuator including a piston and a cylinder within an opening in a back plate and providing an adjustment piece capable of movably interlocking with the piston of the valve pin actuator and being coupled to a valve pin via a connector. The method also includes the steps of decoupling the connector and the adjustment piece and withdrawing the piston and the adjustment piece without removing the cylinder, the connector or the valve pin from the opening and without moving the adjustment piece with respect to the piston.

Another aspect of the present invention is a method for reassembling an actuator of an injection molding apparatus after maintenance including the step of providing a piston and a cylinder. The cylinder is positioned within a backplate. Another step is providing an adjustment piece movably interlocked with the piston and coupled to a valve pin and providing an anti-rotation device for maintaining a rotational alignment of valve pin during operation of the actuator. Another step is inserting the valve pin, the adjustment piece and the piston within the cylinder and rotatably aligning the valve pin within the actuator via the anti-rotational device.

BRIEF DESCRIPTION OF THE FIGURES

Embodiments of the present invention will now be described more fully with reference to the accompanying drawings in which like reference numerals indicate similar structure.

DETAILED DESCRIPTION OF THE INVENTION

Figure 1:
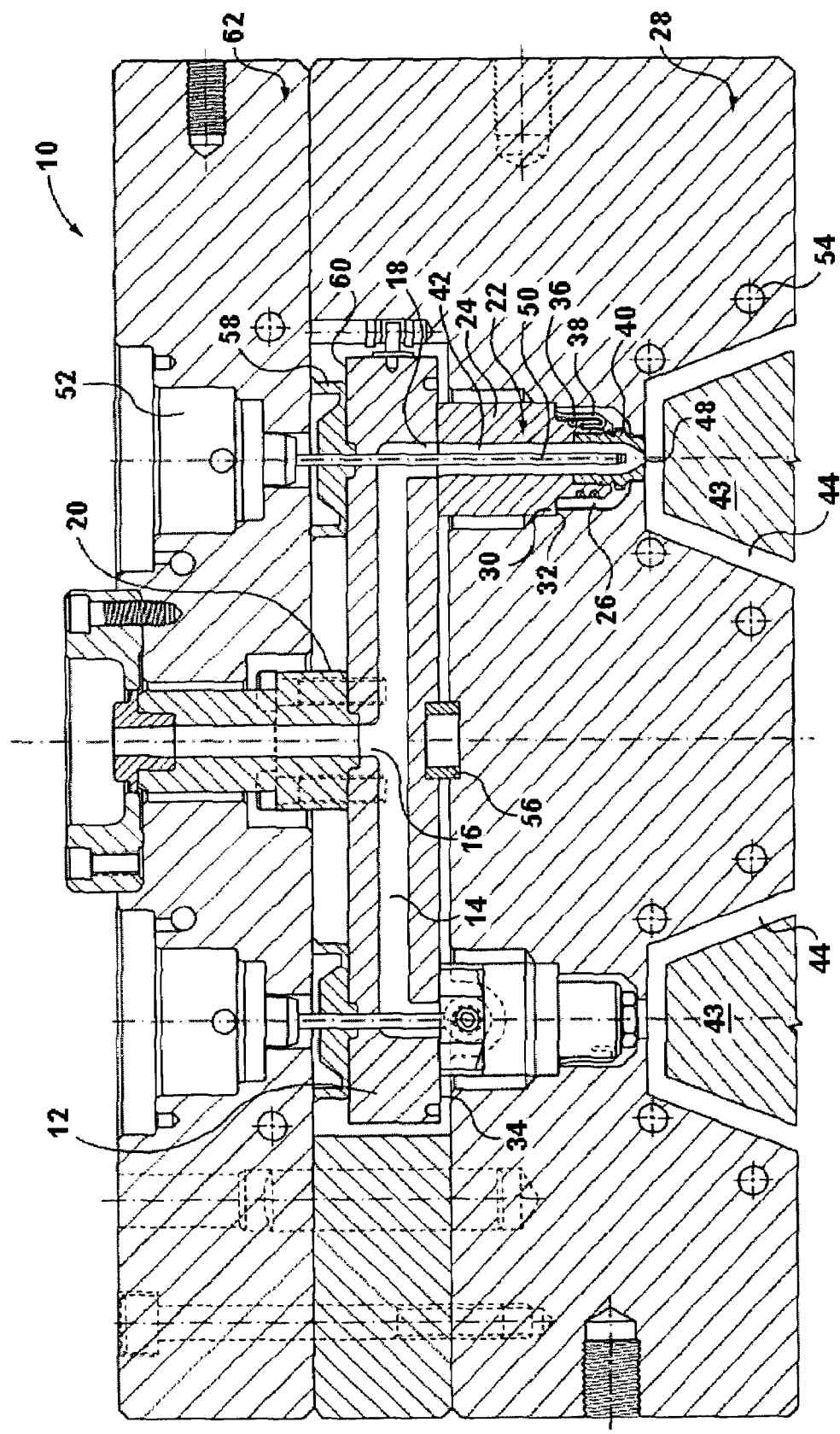
FIG. 1 is a side view partly in section of an injection molding apparatus according to an embodiment of the present invention.

Referring now to FIG. 1, an injection molding apparatus 10 is generally shown. Injection molding apparatus 10 includes a manifold 12 having a manifold melt channel 14. Manifold melt channel 14 extends from an inlet 16 to a manifold outlet 18. Inlet 16 of manifold melt channel 14 receives melt from a machine nozzle (not shown) through a sprue bushing 20 and delivers the melt to a hot runner nozzle 22, which is in fluid communication with manifold outlet 18. Although a pair of hot runner nozzles 22 is shown in FIG. 1, it will be appreciated that a typical injection molding apparatus may include only one or a plurality of manifold outlets such that each manifold outlet 18 delivers melt to a respective hot runner nozzle.

Each nozzle 22 is received in an opening 26 in a mold plate 28. Nozzle 22 includes a nozzle body 24 having a step 30. Step 30 abuts a shoulder 32 of opening 26 to maintain nozzle 22 in abutment with a lower surface 34 of manifold 12. Nozzle body 24 is heated by a heater 36 and further includes a thermocouple 38.

A nozzle tip 40 is received in a downstream end of nozzle body 24. Nozzle tip 40 is threadably coupled to nozzle body 24 and therefore may be easily removed for repair or replacement. A nozzle melt channel 42 extends through nozzle body 24 and nozzle tip 40. Nozzle melt channel 42 is in communication with manifold outlet 18 and receives melt from manifold channel 14.

A mold cavity 44 is provided between mold plate 28 and a mold core 43. Mold cavity 44 receives melt from nozzle melt channel 42 through a mold gate 48. Mold gate 48 is selectively openable by a valve pin 50, which is movable into and out of engagement with mold gate 48 by an actuator 52. Cooling channels 54 extend through mold plate 28 to cool mold cavity 44.

Manifold 12 is maintained in position relative to mold plate 28 by a locating ring 56. Spacers 58 are provided between an upper surface 60 of manifold 12 and a back plate 62.

Figure 2:
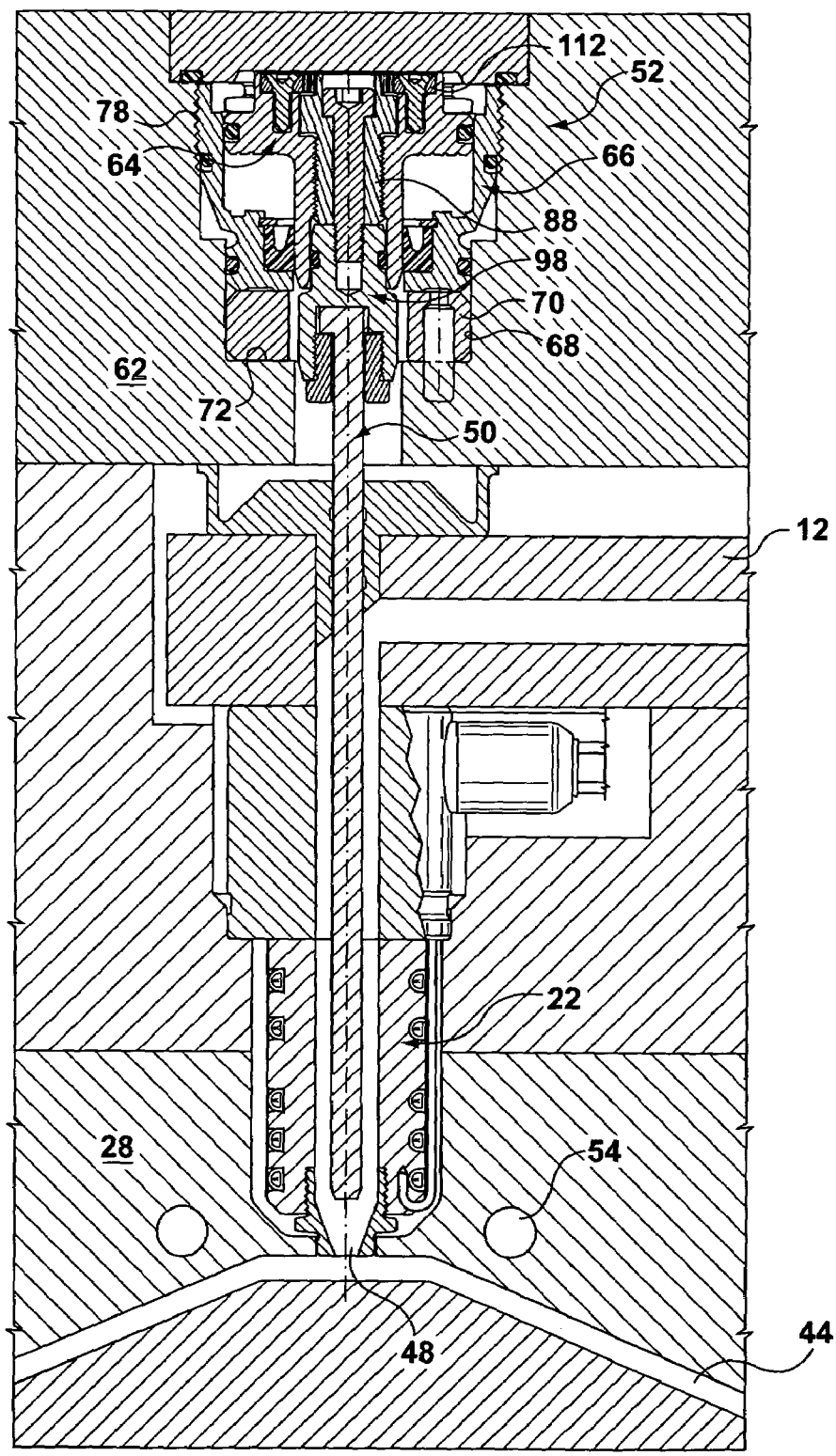
FIG. 2 is a side sectional view of a portion of FIG. 1 in which a valve pin is in an open position.
Figure 3:
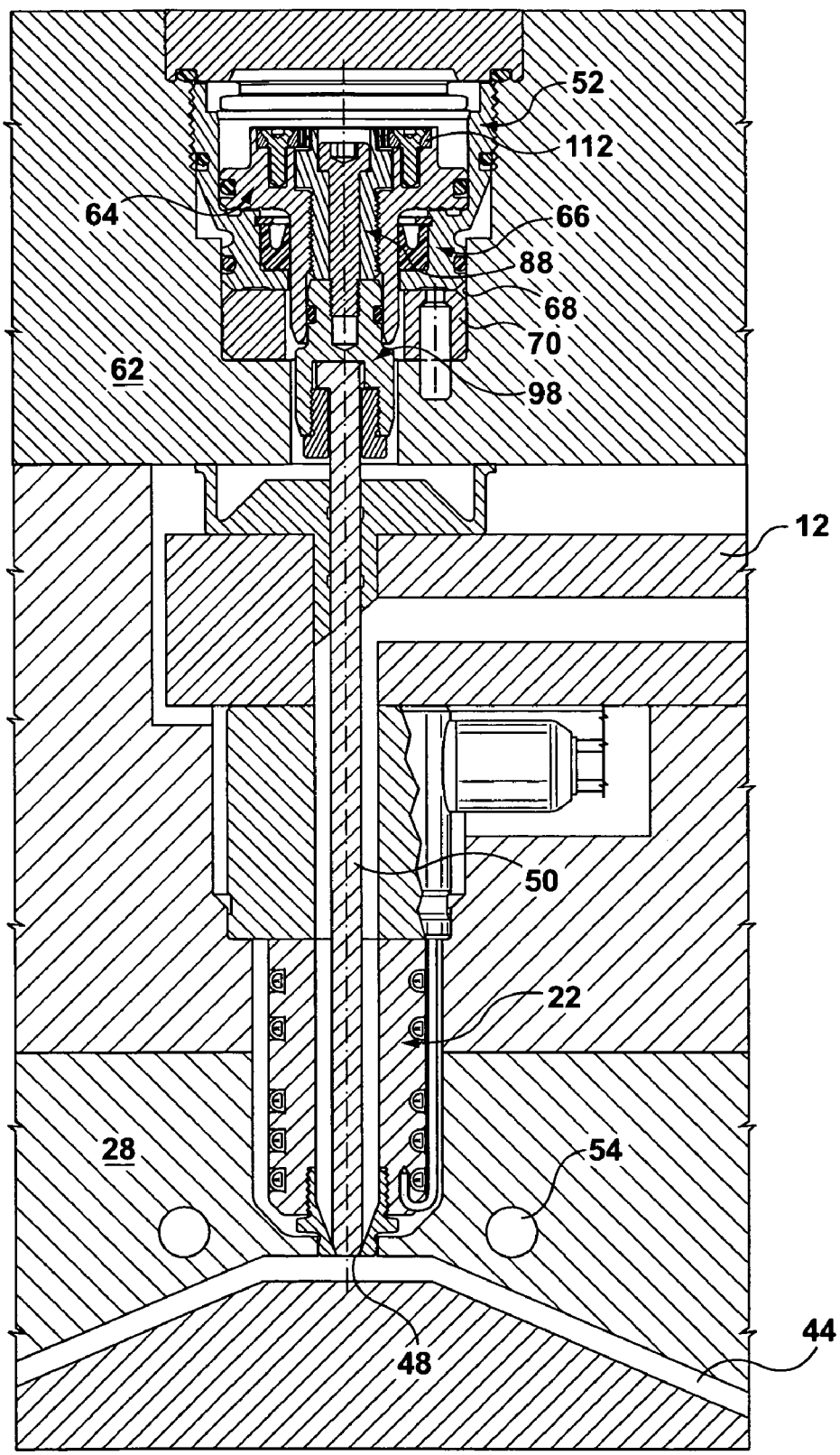
FIG. 3 is a side sectional view similar to FIG. 2 in which the valve pin is in a closed position.
Figure 4:
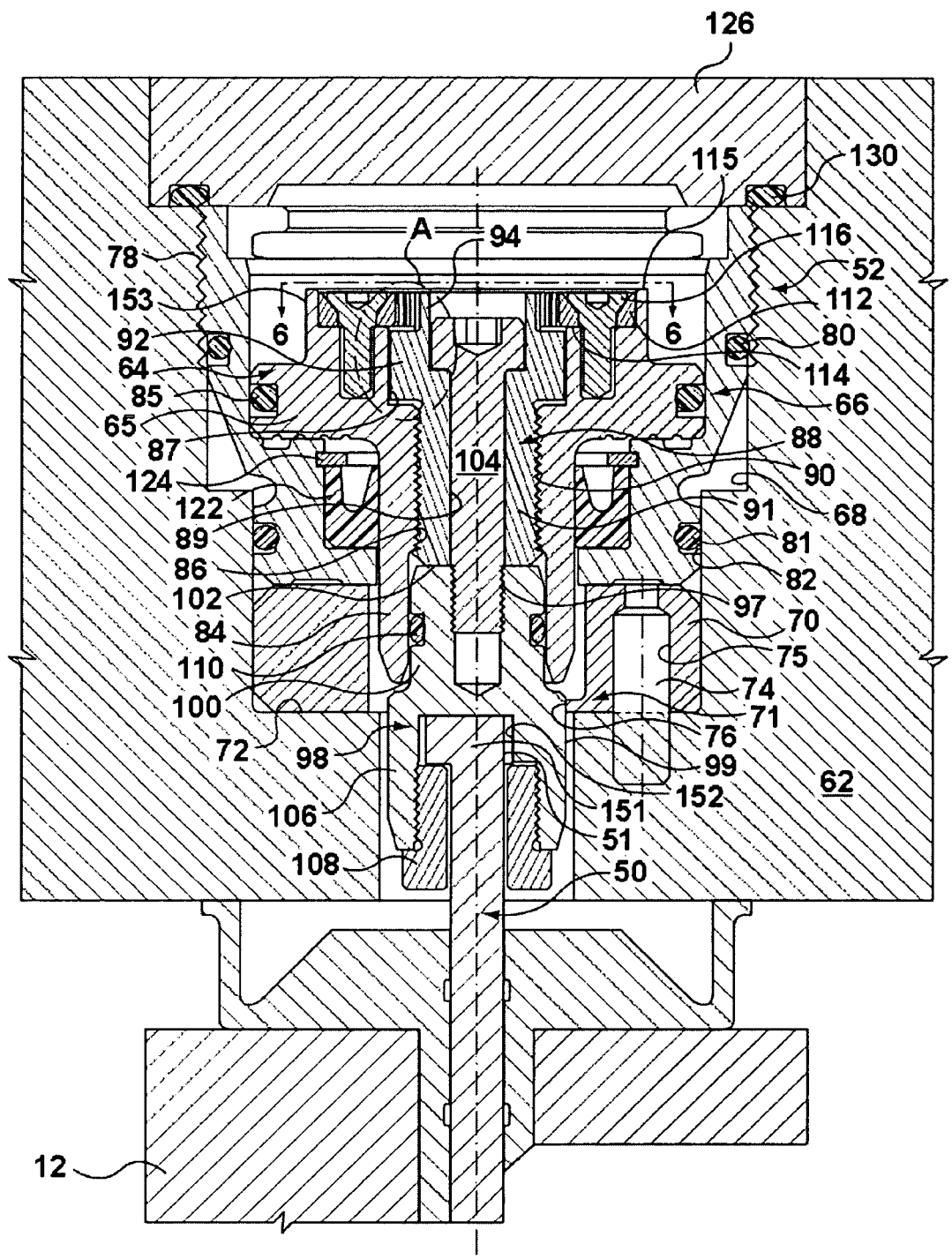
FIG. 4 is an enlarged view of a portion of FIG. 3.

Referring to FIGS. 2 to 4, actuator 52 of injection molding apparatus 10 is shown in greater detail. In FIGS. 1 and 2, mold gate 48 is shown in an open position in which valve pin 50 is retracted and not seated in mold gate 48. In FIGS. 3 and 4, mold gate 48 is shown in a closed position in which valve pin 50 is extended and seated to seal mold gate 48.

As shown in FIGS. 2 and 3 and in further detail in FIG. 4, actuator 52 includes a piston 64 that is slidable within a cylinder 66. Cylinder 66 is disposed in an opening 68 in back plate 62. Cylinder 66 abuts a collar 70 that is located between cylinder 66 and an end surface 72 of opening 68. Cylinder 66 includes threads at an upper end thereof that mate with threads provided in opening 68 to provide a threaded connection 78 therebetween. O-rings 80 and 81 are provided between cylinder 66 and a side wall 82 of opening 68 to provide a seal therebetween.

Figure 5:
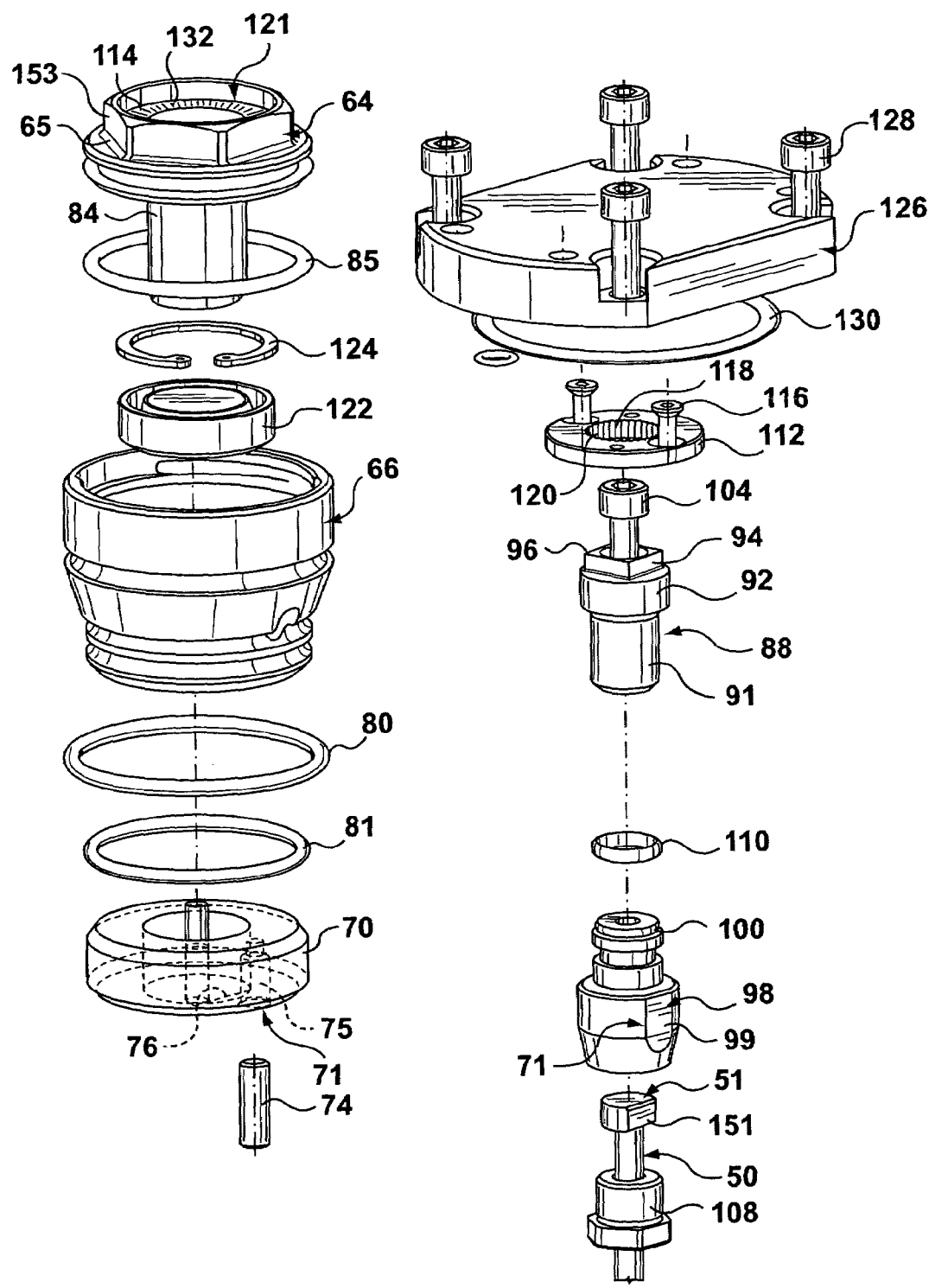
FIG. 5 is an exploded view of an actuator of the injection molding apparatus of FIGS. 1 to 4.
Figure 6:
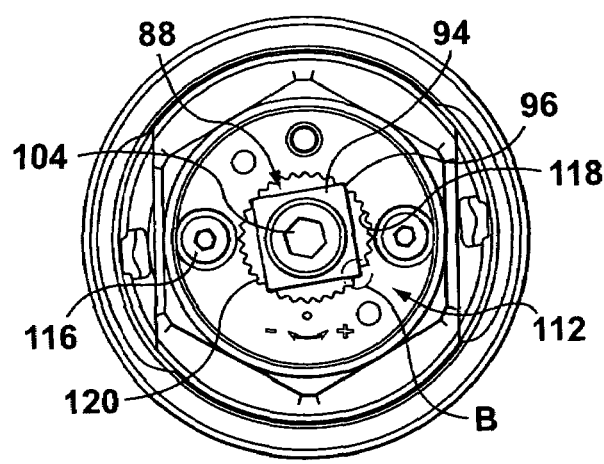
FIG. 6 is a cross-sectional view taken along line 6-6 of FIG. 4.
Figure 8:
FIG. 8 is an enlarged view of portion B of FIG. 6.

Piston 64 includes a head portion 65, a rod portion 84, a large bore 87 and a small bore 86. Large bore 87 and small bore 86 are coaxial and extend through the axial length of piston 64. An O-ring 85 surrounds head portion 65 to provide a seal between piston 64 and cylinder 66. An adjustment piece 88 includes a rod portion 91 and an enlarged portion 92. Rod portion 91 is received in small bore 86 of piston 64 and is coupled thereto by a threaded connection 90, while enlarged portion 92 is received in large bore 87 of piston 64 and is provided between threaded connection 90 and an upwardly extending flange 94. Flange 94 of adjustment piece 88 has a generally polygonal-shaped cross-section including defined corners. For example, FIGS. 5, 6 and 8 illustrate a square-shaped flange 94 with four square corners 96.

Figure 7:
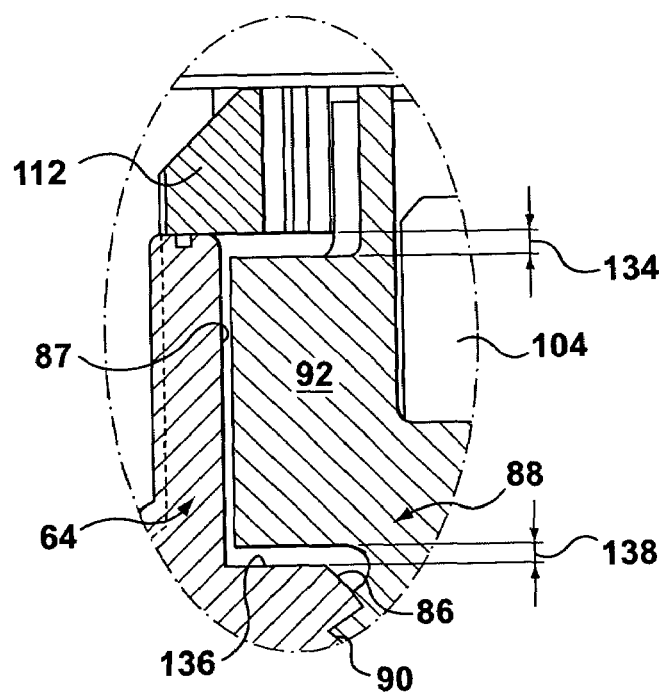
FIG. 7 is an enlarged view of portion A of FIG. 4.

As shown in FIG. 7, enlarged head portion 92 is spaced from a locking device 112 by a first distance 134 and is spaced from a shoulder 136 of large bore 87 of piston 64 by a second distance 138. Rotation of adjustment piece 88 relative to piston 64 increases one of first and second distances 134, 138, while decreasing the other of first and second distances 134, 138 reciprocally, depending upon in which direction adjustment piece 88 is rotated. First and second distances 134, 138 may be sized such that adjustment piece 88 cannot be rotated more that 90% of a full turn. Limiting distances 134, 138 in this way simplifies the operation for a user since it eliminates requiring a certain number of full turns, which becomes hard to identify and record. A 90% limitation of a full turn will most often be sufficient for accurate adjustment of the axial position of valve pin 50, when an approximate valve pin length has been calculated and valve pin 50 has been initially machined based on this approximation prior to positioning valve pin 50 with respect to actuator 52. However, in an alterative embodiment, distances 134, 138 may be sized such that a larger or smaller adjustment range is provided and adjustment piece 88 may be rotated greater or less than 90% of a full turn, as desired.

Referring back to FIGS. 2, 3 and the detail of FIG. 4, a connector 98 includes a first end 100 that is partially received in rod portion 84 of piston 64 and abuts an end surface 102 of adjustment piece 88. A fastener 104, such as a bolt, extends through a bore 89 in adjustment piece 88 and engages connector 98 at a threaded connection 97 to firmly couple connector 98 to adjustment piece 88. Connector 98 further includes a valve pin-receiving portion 106, which is sized to receive a head 51 of valve pin 50. A head securing nut 108 is provided to secure valve pin head 51 to connector 98 so that as piston 64 moves, adjustment piece 88, connector 98 and valve pin 50 are movable along with piston 64 as a single unit. An o-ring 110 surrounds first end 100 of connector 98 to provide a seal between piston 64 and connector 98 as they move with respect to one another and to prevent leakage of hydraulic fluids or pneumatic air from piston 64 and cylinder 66 operation.

An anti-rotation device 71 is provided in actuator 52 to keep valve pin 50 in consistent rotational alignment with the mold gate 48. Sometimes fine wearing on valve pin 50 over time ensures a good fit within the mold gate 48. However if valve pin 50 rotates within actuator 52, that same wear in a different rotational position will cause additional wear or misalignment with the mold gate 48, which may lead to poor quality products. In the embodiment of FIGS. 4 and 5, anti-rotation device 71 prevents axial rotation of valve pin 50, connector 98 and a collar 70 to ensure consistent placement of valve pin 50 with respect to mold gate 48.

In order to generally prevent rotation of connector 98 relative to collar 70, anti-rotation device 71 includes a flat wall 99 of connector 98 abutting a flat inner wall portion 76 of collar 70, which can be seen in FIGS. 4 and 5. Flat wall 99 of connector 98 may slide axially with respect to wall portion 76 of collar 70, but connector 98 will not rotate with respect to collar 70. Further, in order to generally prevent rotation of collar 70 relative to back plate 62, anti-rotation device 71 includes an aperture 75 in collar 70 that receives a first dowel 74. First dowel 74 engages both back plate 62 and collar 70. Therefore, rotation of connector 98 relative to back plate 62 is generally prevented. Since connector 98 is fastened to adjustment piece 88, adjustment piece 88 also will not rotate within actuator 52.

Another feature of anti-rotation device 71 is the shape of valve pin head 51. Valve pin head 51 is a generally circular pin head, except for a flat surface 151, as shown in FIG. 5, which abuts a flat inside surface 152 of connector 98. Flat surface 151 prevents valve pin 50 from rotating within connector 98.

Locking device 112 is a sleeve that abuts an upper end surface 114 of piston 64 and is secured thereto by fasteners 116. As shown in FIGS. 5 and 6, locking device 112 includes a cutout 118 having teeth 120. As illustrated in FIG. 6, cutout 118 surrounds flange 94 of adjustment piece 88. Teeth 120 of locking device 112 engage corners 96 of flange 94, as shown in detail in FIG. 8. Therefore, piston 64 will not rotate with respect to adjustment piece 88 when locking device 112 is in position. In order to adjust the valve pin 50, locking device 112 must first be removed.

A cylinder cap 126 covers cylinder 66 and is secured to back plate 62 by fasteners 128. An O-ring 130 is provided to seal the cylinder 66 and cylinder cap 126 assembly.

A rod seal 122 is provided in cylinder 66 and surrounds rod portion 84 of piston 64. Rod seal 122 is provided to generally prevent leakage of hydraulic fluid or pneumatic air from cylinder 66. A retaining ring 124 is provided to maintain rod seal 122 in place relative to cylinder 66.

In order to adjust the position of valve pin 50 relative to mold gate 48 to ensure that valve pin 50 seats properly therein, cylinder cap 126 is first removed by loosening fasteners 128. Locking device 112 is removed by loosening fasteners 116 to expose upper end surface 114 of piston 64.

The position of valve pin 50 with respect to mold gate 48 is adjusted by changing the axial position of adjustment piece 88 with respect to piston 64. Since flat wall 99 prevents rotational motion of connector 98 and adjustment piece 88, piston 64 is rotated within cylinder 60 by engaging a hexagonal flange 153 of piston 64 with a tool (not shown). As piston 64 rotates, adjustment piece 88 is axially moved along threaded connection 90 with respect to piston 64. Since valve pin 50 is coupled to adjustment piece 88 via connector 98, valve pin 50 is also axially moved by the rotation of piston 64.

With a conventional right-handed, threaded connection, rotation of piston 64 in a clockwise direction will move valve pin 50 away from mold gate 48, and adjustment piece 88 will axially move with respect to piston 64, so that distance 134 decreases and distance 138 increases. As such, adjustment piece 88 pulls connector 98 with respect to piston 64 towards head portion 65 of piston 64. Rotation of piston 64 in a counter clockwise direction will move valve pin 50 towards mold gate 48, and adjustment piece 88 will move with respect to piston 64, such that distance 134 increases and distance 138 decreases. As such, adjustment piece 88 pushes connector 98 with respect to piston 64 towards manifold 12.

Locking device 112 is then replaced and fasteners 116 tightened. Teeth 120 of locking device cutout 118 engage corners 96 of adjustment piece 88 to restrict rotation of adjustment piece 88 and lock the new valve pin position in place. Cylinder cap 126 is then replaced and fasteners 128 are tightened. In the event that the adjustment was not sufficient, the procedure may be repeated until the relative position of valve pin 50 with respect to mold gate 48 is acceptable.

Figure 18:
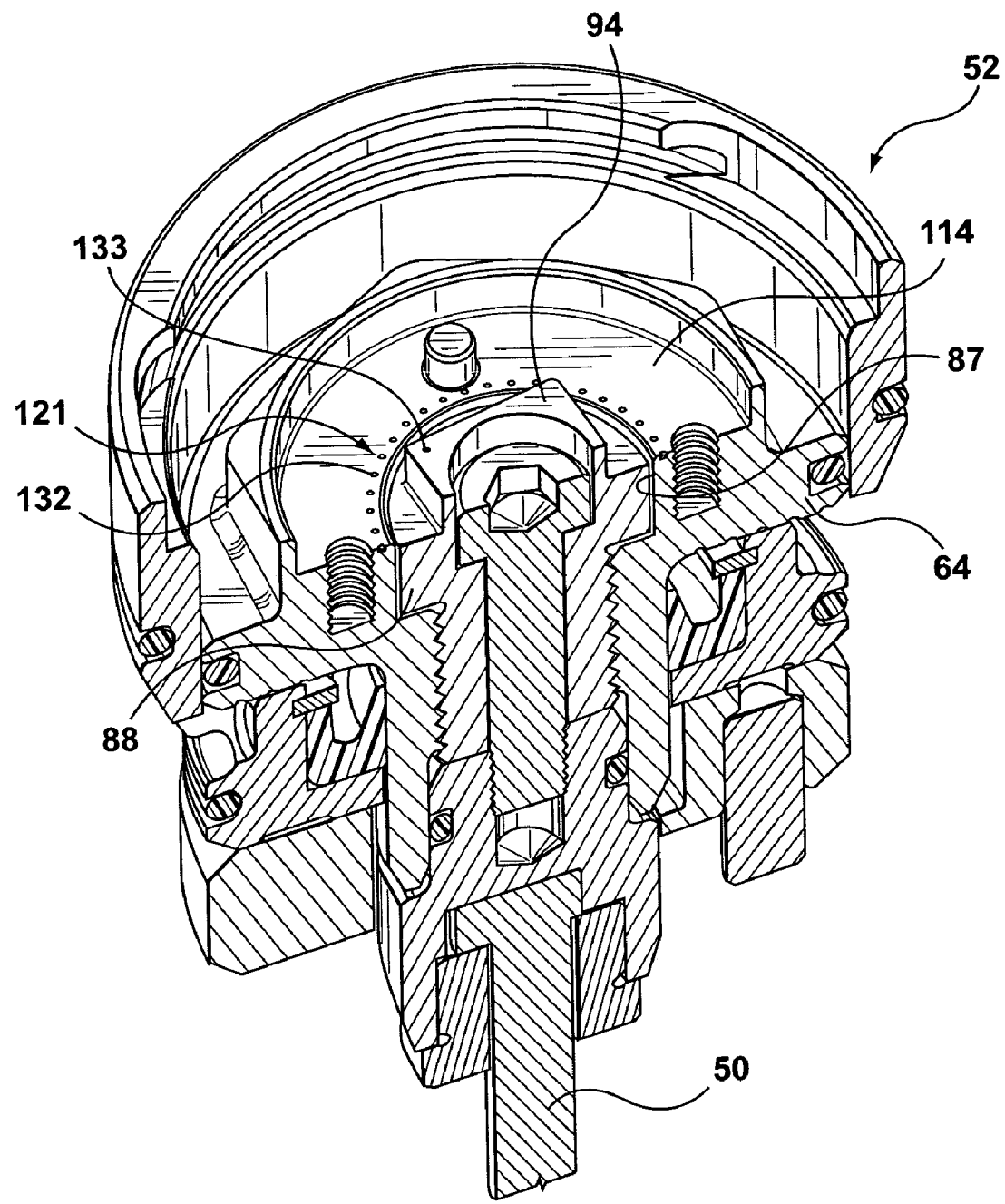
FIG. 18 is a top perspective sectional view of the actuator of FIGS. 1 to 5.

FIG. 18 illustrates an upper end surface 114 of piston 64 of actuator 52, wherein the locking device 112 has been removed. Upper end surface 114 includes an indicator 121 to gage longitudinal or axial movement of valve pin 50. For example, FIG. 18 shows indicator 121 including gradation marks 132 on upper end surface 114 of piston 64, which are evenly spaced about large bore 87. Indicator 121 also includes a locating mark 133 positioned on one corner 96 of flange 94 of adjustment piece 88. Gauging the movement of locating mark 133 of flange 94 with respect to gradation marks 132 of upper end surface 114 of piston 64, indicates the longitudinal movement of valve pin 50 since the distance between each gradation mark 132 corresponds to a predetermined axial distance that adjustment piece 88 moves in a longitudinal direction when piston 64 is rotated. For example, an axial distance of approximately 0.025 mm, or 0.001 inches, per gradation would be suitable in order to provide significant but limited adjustments to the axial position of valve pin 50 with respect to mold gate 48.

In operation, the position of valve pin 50 relative to mold gate 48 is adjusted prior to commencement of a molding cycle. Once valve pin 50 is properly adjusted, actuator 52 moves piston 64 to an open position retracting valve pin 50, as shown in FIGS. 1 and 2. Melt is injected from the machine nozzle through sprue bushing 20, manifold channel 14 of manifold 12, nozzle melt channel 42 of nozzle 22, and mold gates 48 and into mold cavity 44. To stop the flow of melt through mold gate 48, actuator 52 will move piston 64 to a closed position extending valve pin 50, as shown in FIGS. 3 and 4. The melt in mold cavities 44 is then cooled and the molded parts are ejected from injection molding apparatus 10.

For routine maintenance, piston 64 and adjustment piece 88 may be removed from injection molding apparatus 10 as a single unit, using two different methods, one where valve pin 50 is extracted and one where it is not. Since there is high possibility of damaging o-rings 80, 81 during each assembly and disassembly of cylinder 66, both methods allow for disassembly of the moving parts of actuator 52 while keeping cylinder 66 in place within opening 68. In the first method, fastener 104 is removed from actuator 52 and a second fastener (not shown) having a larger diameter and shorter than fastener 104 is inserted. The second fastener engages threads formed along an interior wall of bore 89 of adjustment piece 88 rather than engaging connector 98.

Once the threads have been engaged, piston 64 and adjustment piece 88 may be removed from the actuator 52 leaving connector 98 in place within collar 70. As such, actuator 52 may be disassembled without extracting valve pin 50, since removing valve pin 50 is time consuming and may cause damage to valve pin 50. The previous adjustment of the axial position of valve pin 50 will not change when disassembled provided that adjustment piece 88 remains positioned with respect to piston 64 at threaded connection 90.

The second method for removing piston 64 and adjustment piece 88 includes withdrawing connector 98 and valve pin 50 as well. In this case, fastener 104 will be taken out and replaced with a longer fastener (not shown). The longer fastener is connected to connector 98 at a first end, as is fastener 104, except that a second end of the longer fastener extends beyond an endmost surface 115 of piston 64, shown in FIG. 4. The longer fastener can be connected to an extraction device, which extracts valve pin 50 in a straight manner with the force applied to an axial location along actuator 52 to reduce the likelihood of damage to valve pin 50. Valve pin 50 can be extracted along with piston 64 and adjustment piece 88 without the need to change the pin-height adjustment and without the need to extract cylinder 66 or disrupt o-rings 80, 81. Anti-rotation device 71 also provide for valve pin rotational alignment upon reassembly of actuator 52. Flat wall 151 of valve pin head 51 aligns with flat wall 152 of connector 98, and flat wall 99 of connector 98 aligns with wall 76 of collar 70, so that a proper rotational position of valve pin 50 with respect to mold gate 48 will be maintained.

Figure 9:
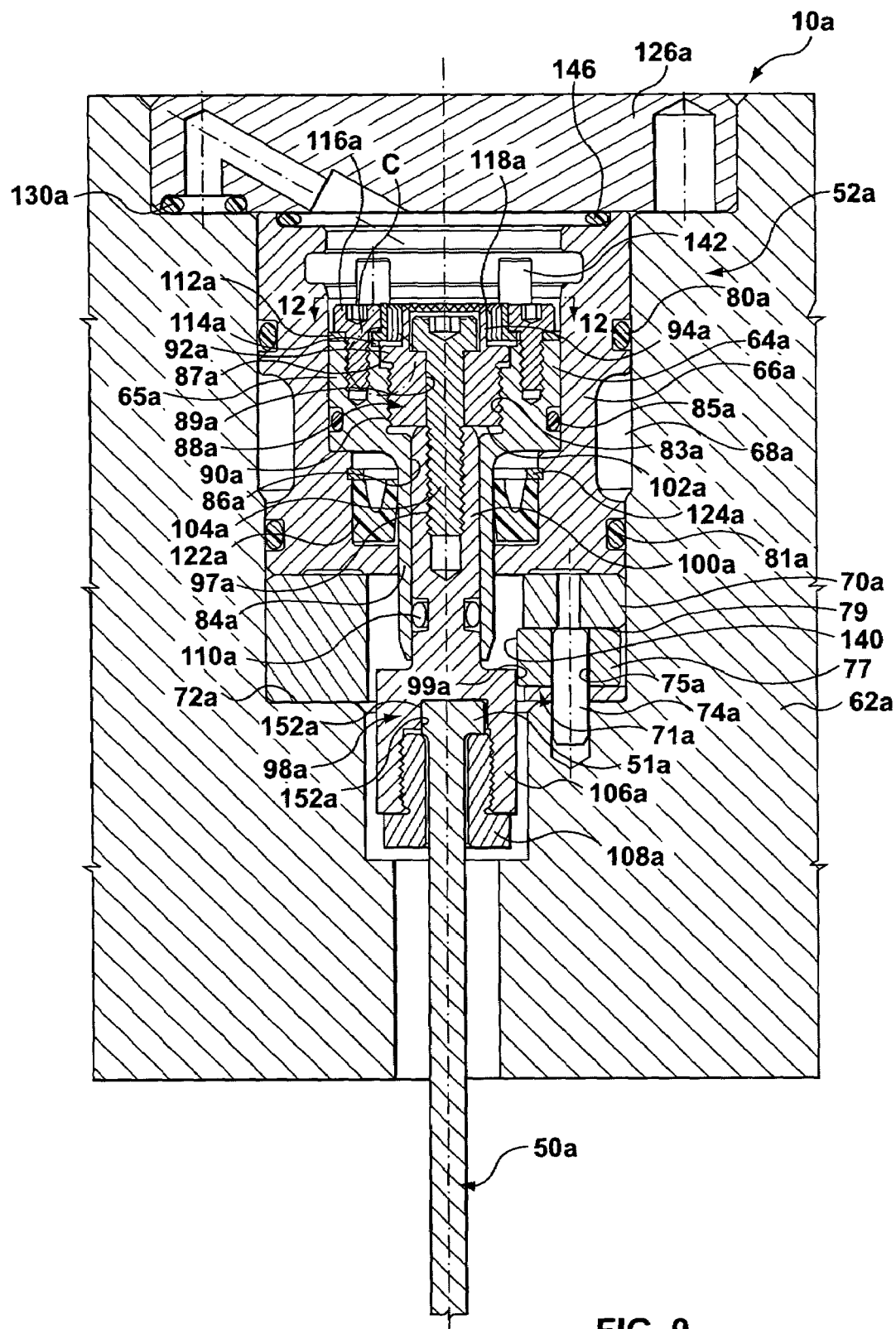
FIG. 9 is a side sectional view of a portion of an injection molding apparatus according to another embodiment of the present invention.
Figure 10:
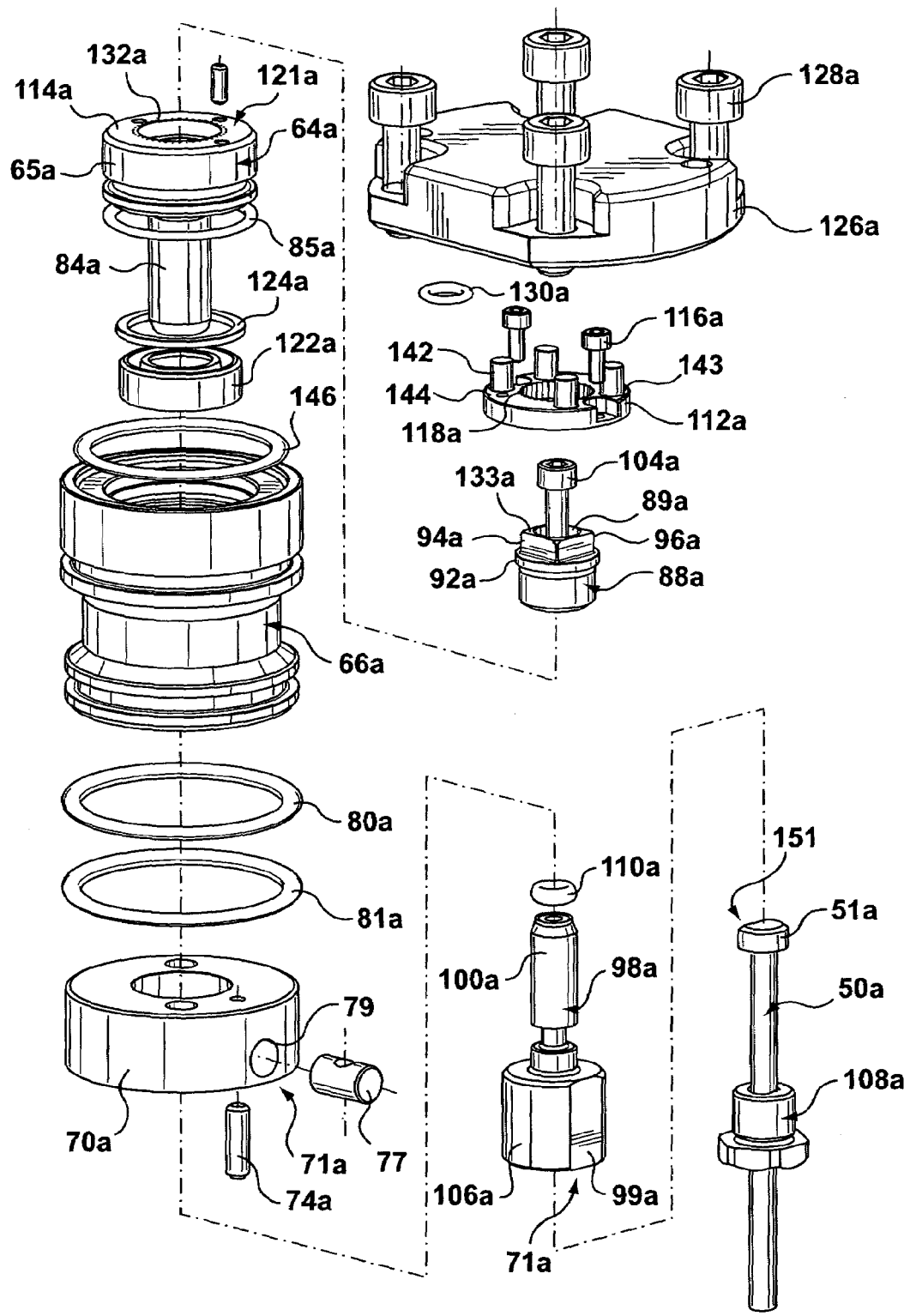
FIG. 10 is an exploded view of an actuator of the injection molding apparatus of FIG. 9.

Referring to FIGS. 9 and 10, another embodiment of an injection molding apparatus 10*a* is shown. Injection molding apparatus 10*a* may be used for valve pins having small diameters or more compact actuators. The embodiment shown in FIGS. 9 and 10 is also utilized in the environment shown in FIG. 1, similar to the previous embodiment. Therefore, for simplicity, only actuator 52*a* and valve pin 50*a* are shown in FIGS. 9 and 10.

Actuator 52*a* includes a piston 64*a* that is slidable within a cylinder 66*a*. Cylinder 66*a* is disposed in an opening 68*a* in back plate 62*a* and abuts a collar 70*a* that is located between cylinder 66*a* and an end surface 72*a* of opening 68*a*. Unlike the previous embodiment, cylinder 66*a* is not threadedly connected to opening 68*a*.

Piston 64*a* includes a head portion 65*a*, a rod portion 84*a*, a large bore 87*a*, a mid-sized bore 83*a* and a small bore 86*a*, which are coaxial and extend through the length of piston 64*a*. An adjustment piece 88*a* is received in mid-sized bore 83*a* of piston 64*a* and is coupled thereto by a threaded connection 90*a*. Adjustment piece 88*a* includes an enlarged portion 92*a*, which is received by large bore 87*a* and is provided between threaded connection 90*a* and a flange 94*a*. Flange 94*a* has a generally polygonal-shaped cross-section including corners 96*a*, which is illustrated as square shaped flange 94*a* with four right corners 96*a* in FIGS. 10 and 12.

A bore 89*a* of adjustment piece 88*a* may be threaded so that adjustment piece 88*a* and piston 64*a* may be removed from actuator 52*a* by removing fastener 104*a* and inserting a second fastener with a larger diameter and shorter than fastener 104*a*. As discussed above with respect to the previous embodiment, this procedure may be used to disassemble piston 64*a* and adjustment piece 88*a* without removing cylinder 66*a* or valve pin 50*a*.

Figure 11:
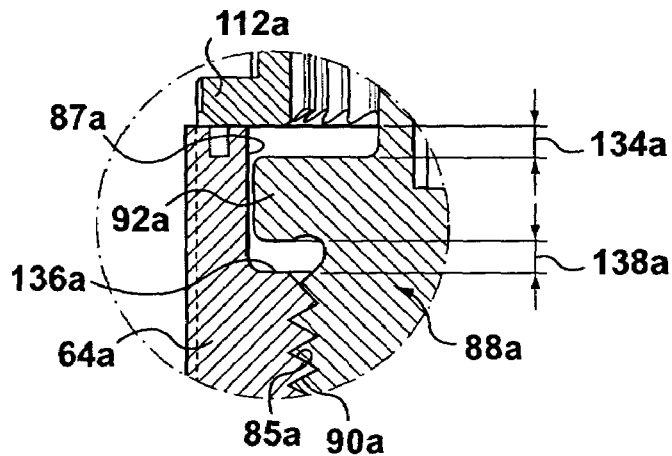
FIG. 11 is an enlarged view of portion C of FIG. 9.

As shown in FIGS. 10 and 11, enlarged head portion 92*a* of adjustment piece 88*a* is spaced from a locking device 112*a* by a first distance 134*a* and is spaced from a shoulder 136*a* of large bore 87*a* of piston 64*a* by a second distance 138a. Rotation of piston 64a to move adjustment piece 88a along threaded connection 90a relative to piston 64a alters the size of first and second distances 134a, 138a. Distances 134a, 138a may be sized such that piston 64a cannot be rotated more that 90% of a full turn, as discussed above with respect to the previous embodiment. As shown in FIG. 10, piston 64a also includes an indicator 121a including gradation marks 132a and a locating mark 133a on flange 94a (shown in FIG. 12), as described with respect to FIG. 18 of the previous embodiment.

A connector 98a includes a first end 100a that is partially received in small bore 86a of piston 64a and abuts an end surface 102a of adjustment piece 88a. Fastener 104a extends through adjustment piece 88a and engages connector 98a at a threaded connection 97a to firmly couple connector 98a to adjustment piece 88a. Connector 98a further includes a valve pin-receiving portion 106a, which is sized to receive a head 51a of valve pin 50a. A head securing nut 108a is provided to secure valve pin head 51a to connector 98a so that as piston 64a moves, adjustment piece 88a, connector 98a and valve pin 50a are movable along with piston 64a as a single unit.

Actuator 52a includes an anti-rotation device 71a. Anti-rotation device 71a includes a flat wall 99a of connector 98a that abuts a flat end surface 140 of a second dowel 77, which extends through a second aperture 79 of collar 70a, to generally prevent rotation of connector 98a relative to second dowel 77. Second dowel 77 is maintained in position by a first dowel 74a, which passes through a first aperture 75a formed in back plate 62a, collar 70a and second dowel 77. First dowel 74a engages both back plate 62a and collar 70a to generally prevent rotation of collar 70a relative to back plate 62a and to thereby restrict rotation of connector 98a. Once again, since connector 98a is firmly coupled to adjustment piece 88a, anti-rotation device 71a prohibits rotation of adjustment piece 88a.

Another feature of anti-rotation device 71a is the shape of valve pin head 51a. Valve pin head 51a is a generally circular pin head, except for a flat surface 151a, as shown in FIGS. 9 and 10, which abuts a flat inside surface 152a of connector 98a. Flat surface 151a prevents valve pin 50a from rotating within connector 98a.

Figure 12:
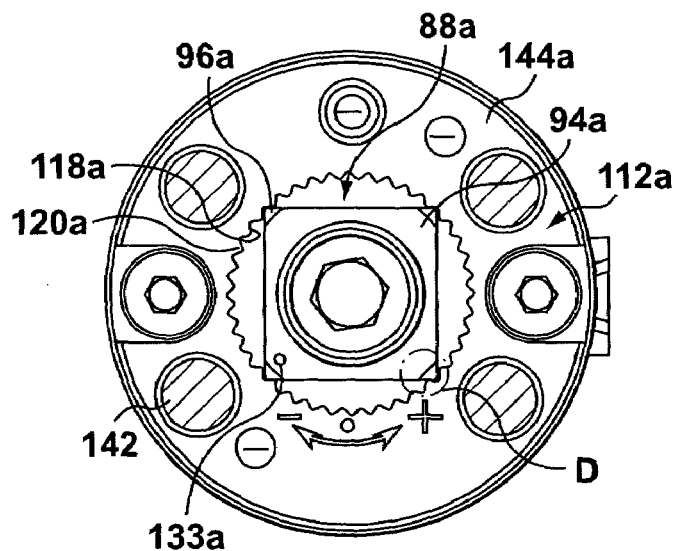
FIG. 12 is a partial cross sectional view taken along line 12-12 of FIG. 9.
Figure 13:
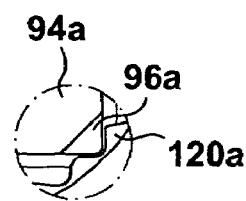
FIG. 13 is an enlarged view of portion D of FIG. 12.

Locking device 112a is also a sleeve that abuts an upper end surface 114a of piston 64a and is secured thereto by fasteners 116a. As shown in FIGS. 10 and 12, locking device 112a includes a cutout 118a having teeth 120a. Cutout 118a surrounds flange 94a of adjustment piece 88a and teeth 120a engage corners 96a thereof, as shown in detail in FIG. 13. Therefore, rotation of adjustment piece 88a is restricted when locking device 112a is in position.

Locking device 112a may include one or more posts 142 that extend from recesses 143 in an upper surface 144 thereof. Posts 142 can be sized to limit the stroke of piston 64a when retracting valve pin 50a. When valve pin 50a is retracted so as to open mold gate 48, valve pin 50a need not open the full distance of the stroke of piston 64a. Posts 142 may be removable or may be cast as part of locking device 112a. Further, posts 142 may be adjustable by interchanging posts 142 with posts of a different length or by machining posts 142. A cylinder cap 126a covers cylinder 66a and is secured to back plate 62a by fasteners 128a.

Similar to the previous embodiment, actuator 52a includes o-rings 80a, 81a, 85a, 110a and 130a, which are provided for sealing purposes. An o-ring 146 is also provided at an upper end of cylinder 66a. Further, a rod seal 122a is provided in cylinder 66a and surrounds rod portion 84a of piston 64a. Rod seal 122a is provided to generally prevent leakage of hydraulic fluid from cylinder 66a. A retaining ring 124a is provided to maintain rod seal 122a in place relative to cylinder 66a.

Adjustment of the position of the valve pin 50a relative to the mold gate is accomplished in the same manner as has been previously described with respect to the embodiment shown in FIGS. 1 to 8. Further, disassembly of the actuator 52a to facilitate removal of piston 64a and adjustment piece 88a as a single unit, or alternatively piston 64a, adjustment piece 88a, connector 98a and valve pin 50a as a single unit is achieved in the same manner as has been previously described with respect to the embodiment shown in FIGS. 1 to 8. In addition, piston 64a and adjustment piece 88 may be removed without valve pin 50a, as has also been previously described with respect to the previous embodiment.

It will be appreciated by a person skilled in the art that actuators 52 and 52a may be hydraulic or pneumatic.

Figure 14A:
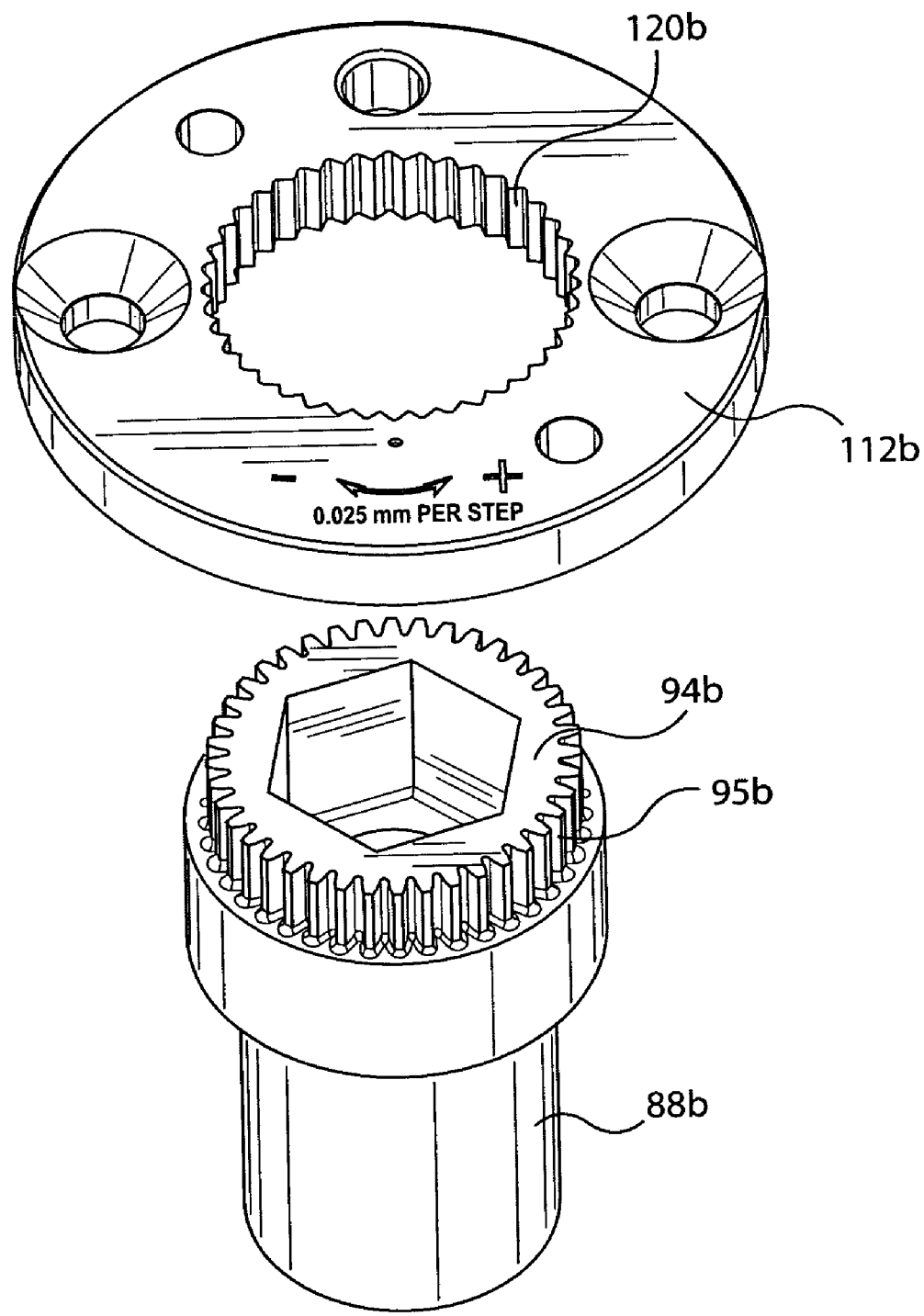
FIG. 14A is an alternate cross-sectional view taken along a line similar to line 6-6 of FIG. 4 showing another embodiment of the present invention.
Figure 14B:
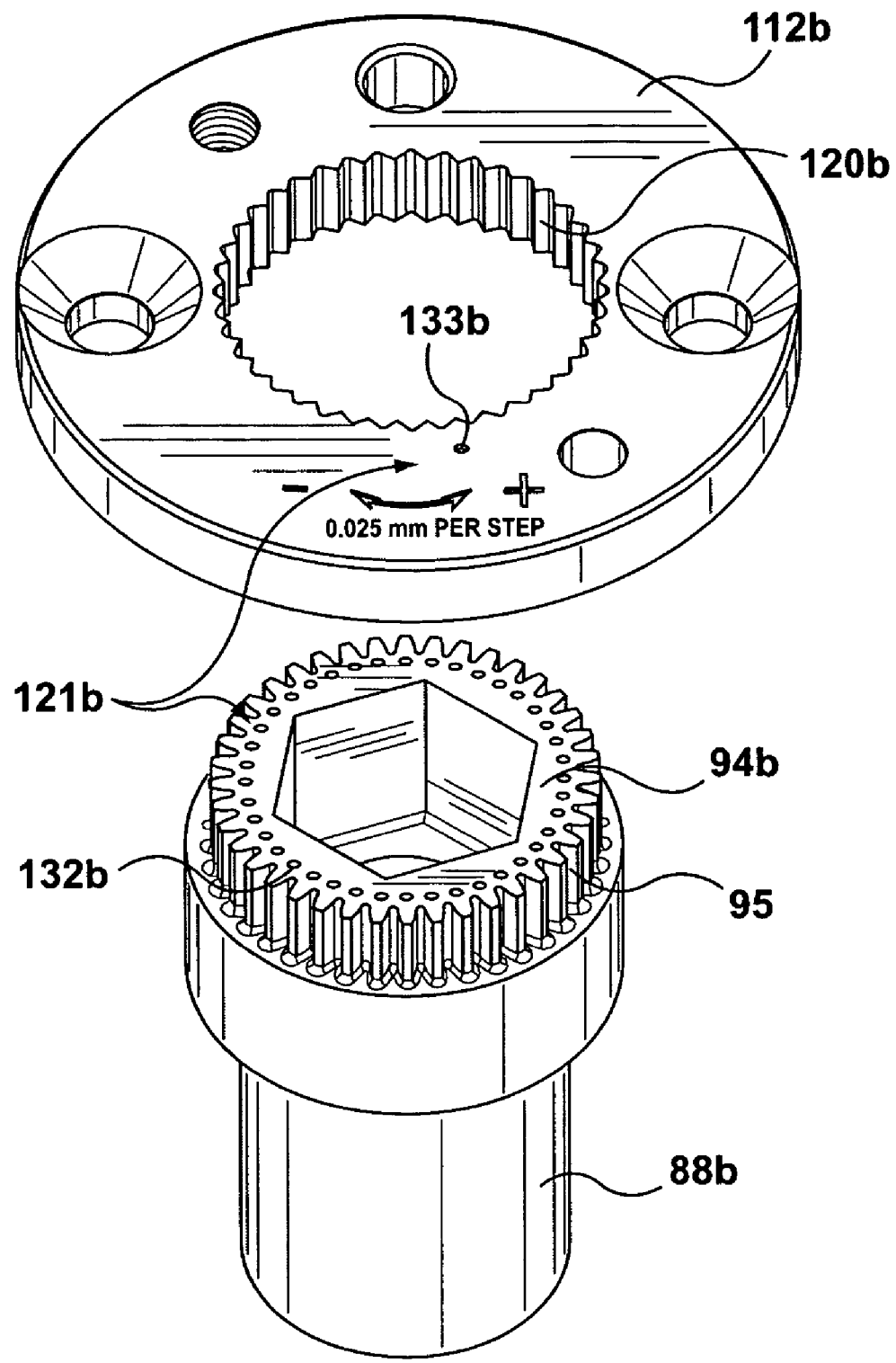
FIG. 14B is an alternative cross-sectional view similar to that of FIG. 14A.
Figure 14C:
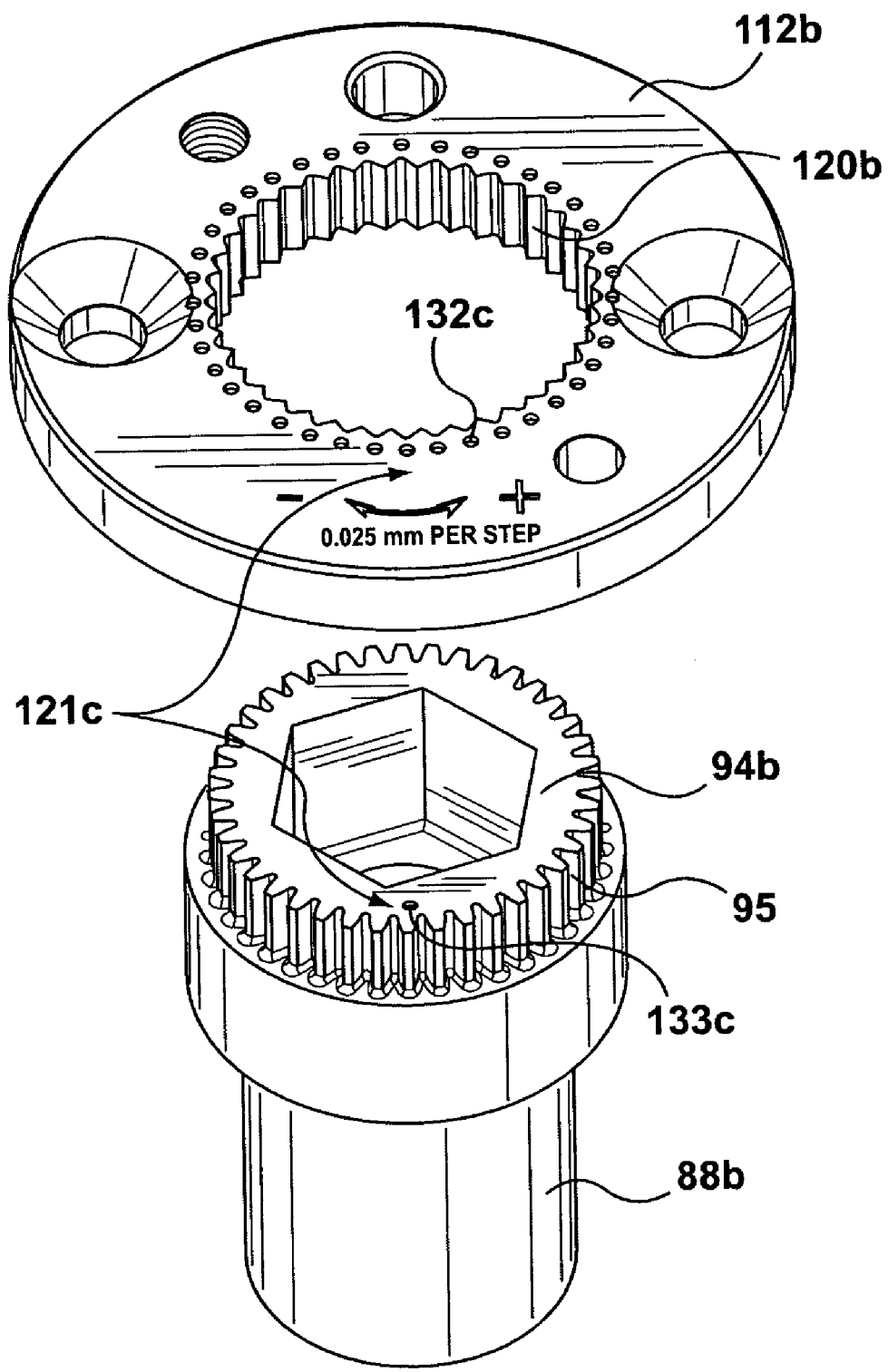
FIG. 14C is an alternative cross-sectional view similar to that of FIG. 14A.

In another embodiment, an adjustment piece 88b may interlock with a piston via a different locking device 112b. For example, in the embodiment shown in FIGS. 14A, a flange 94b of adjustment piece 88b may have a plurality of teeth 95 for mating with teeth 120b of locking device 112b, which is fastened to a piston (not shown). FIGS. 14B and 14C illustrate the same locking device as shown in FIG. 14A. In addition, FIGS. 14B and 14C illustrate indicators 121b and 121c, respectively. Unlike indicators 121 and 121a of the previous embodiments, indicator 121b includes a locating mark 133b positioned in one spot adjacent teeth 120b of locking device 112b and gradation marks 132b of flange 94b of adjustment piece 88b, which are evenly spaced thereabout. Meanwhile indicator 121c, in FIG. 14C, also includes a locating mark 133c positioned in one location on flange 94b of adjustment piece 88b and gradation marks 132c evenly spaced adjacent teeth 120b of locking device 112b Gauging the movement of locating marks 133b and 133c with respect to gradation marks 132b and 132c, indicates the longitudinal movement of valve pin 50 since the distance between each gradation mark 132b/132c corresponds to a predetermined axial distance that adjustment piece 88b moves when the piston is rotated. The advantage of having indicators 121b and 121c positioned on locking device 112b rather than on the piston is that the positioning of the valve pin is visible without having to remove the locking device 112b.

Another embodiment (not shown) similar to that shown in FIGS. 4 and 5, includes an indicator with gradation marks on the adjustment piece, similar to that shown in FIG. 14B, and a single mark on the piston, rather than the other way around as shown in FIGS. 4 and 5.

Figure 15:
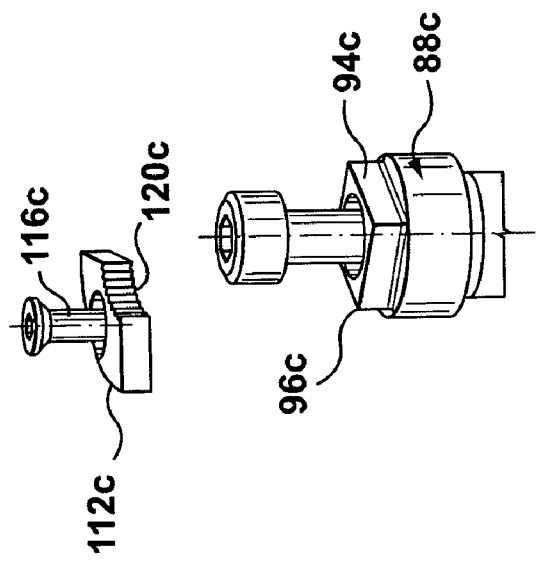
FIG. 15 is a view similar to a portion of FIG. 5 showing yet another embodiment of the present invention.

It will further be appreciated that a locking device is not restricted to being a sleeve. Another embodiment of a locking device 112c is shown in FIG. 15. Locking device 112c is coupled to a piston (not shown) via a fastener 116c. Locking device 112c includes teeth 120c that engage at least one corner 96c of a flange 94c of an adjustment piece 88c. Locking device 112c does not entirely surround and engage all corners 96c of flange 94c, but holds adjustment piece 88c by restraining only a portion of flange 94c.

Figure 17:
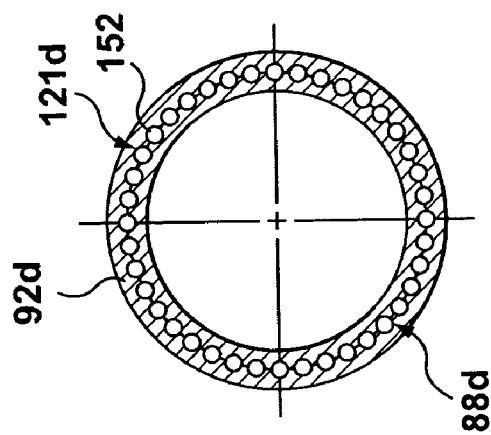
FIG. 17 is a cross-sectional view taken along line 17-17 of FIG. 16.
Figure 16:
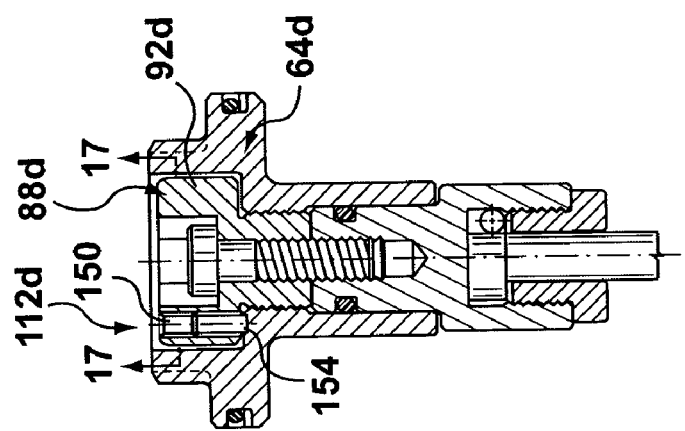
FIG. 16 is a side sectional view of a portion of an injection molding apparatus according to another embodiment of the present invention.

Referring to FIGS. 16 and 17, still another embodiment of a locking device 112d is shown. In this embodiment, the locking device 112d is generally a fastener 150, such as a pin, a dowel, a bolt or the like, that is received in one of a plurality of apertures 152 extending through enlarged head 92d of an adjustment piece 88d. The fastener 150 is received in a recess 154 in piston 64d to restrict relative rotational motion between the adjustment piece 88d and the piston 64*d*. The apertures 152 are spaced such that the distance therebetween corresponds to a predetermined axial distance. As such, an indicator 121*d* of movement of adjustment piece 88*d* with respect to piston 64*d* may include apertures 152.

Figure 19:
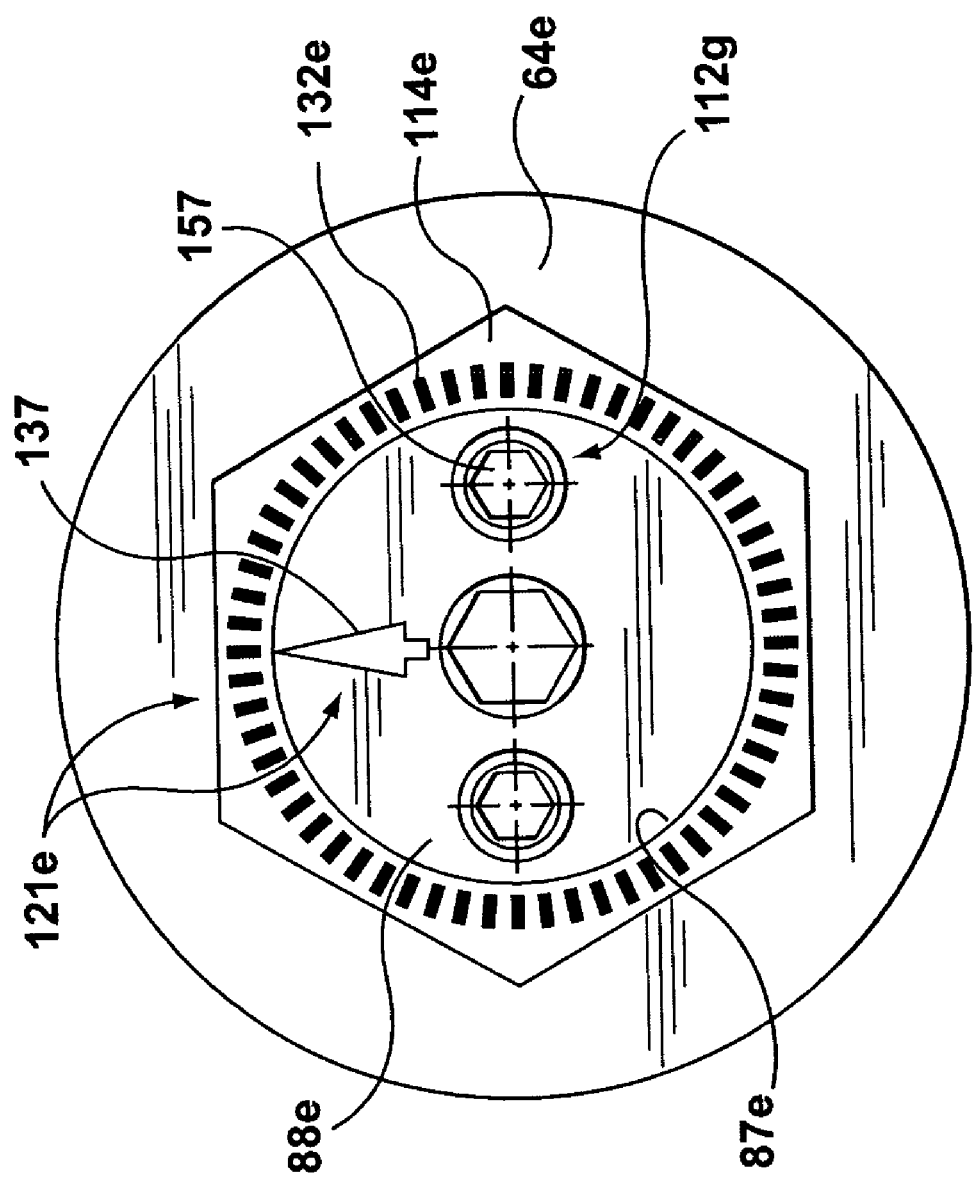
FIG. 19 is an alternative cross-sectional view taken along line 6-6 of FIG. 4 showing another embodiment of the present invention.
Figure 20:
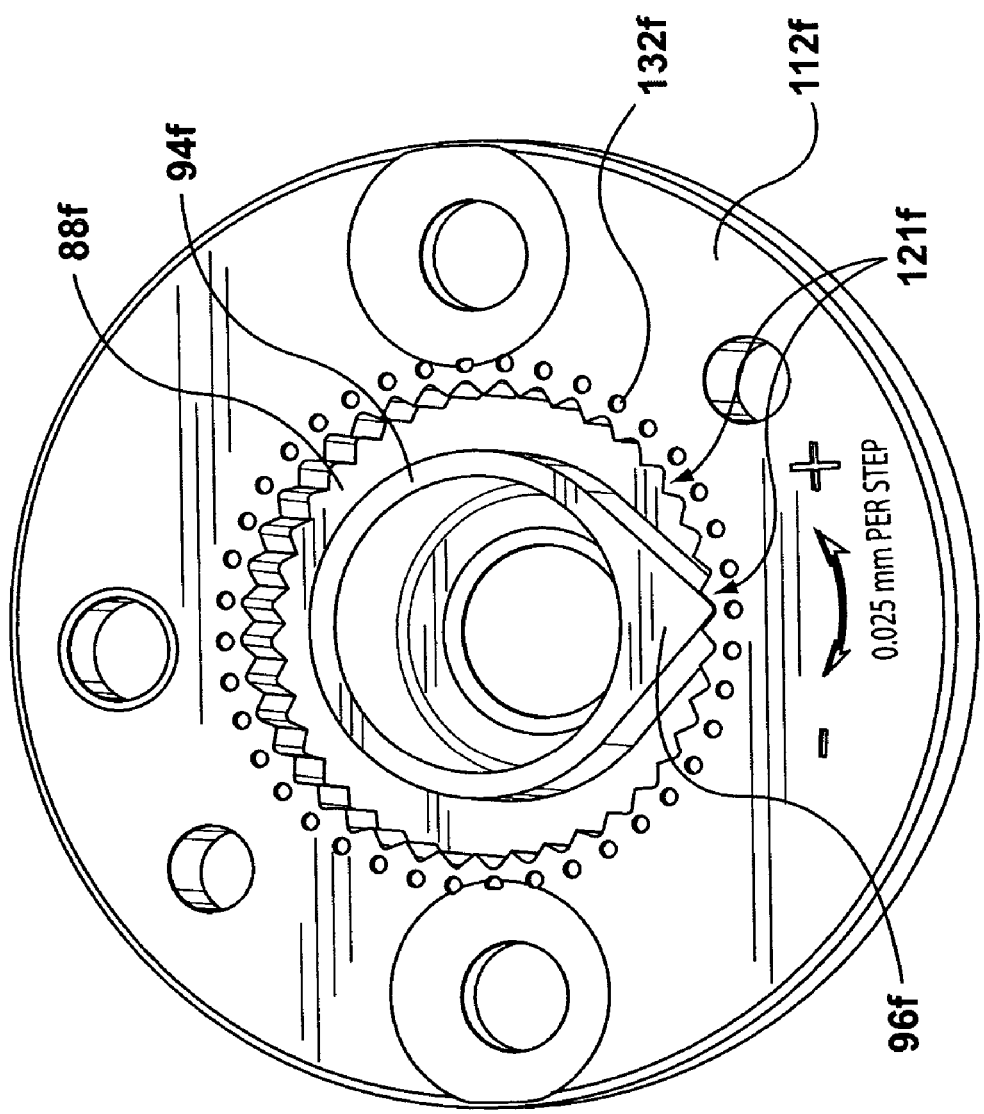
FIG. 20 is an alternative cross-sectional view taken along line 6-6 of FIG. 4 showing another embodiment of the present invention.

Referring to FIGS. 19 and 20, additional embodiments of indicators 121*e* and 121*f* are shown, which may be applicable to any of the actuators described or otherwise disclosed herein. Indicator 121*e* of FIG. 19 includes an arrow 137, as a locating mark, positioned on adjustment piece 88*e* and gradation marks 132*e* on upper end surface 114*e* of piston 64*e*, which are evenly spaced about large bore 87*e*. The position of a valve pin with respect to a mold gate is then indicated by the movement of arrow 137 with respect to gradation marks 132*e*. Similarly, indicator 121*f* of FIG. 20 shows a flange 94*f* of adjustment piece 88*f* having only one corner 96*f*, which formed an arrow-shape, rather than a polygonal shape. As such corner 96*f* will be aligned with gradation marks 132*f* on locking device 112*f* to indicate the position of a valve pin with respect to a mold gate. Alternatively, gradation marks 132*f* may be positioned on a piston rather than on locking device 112*f* and adjustment piece 88*f* with a flange 94*f* may be utilized in any of the actuators disclosed or otherwise described herein.

Figure 21:
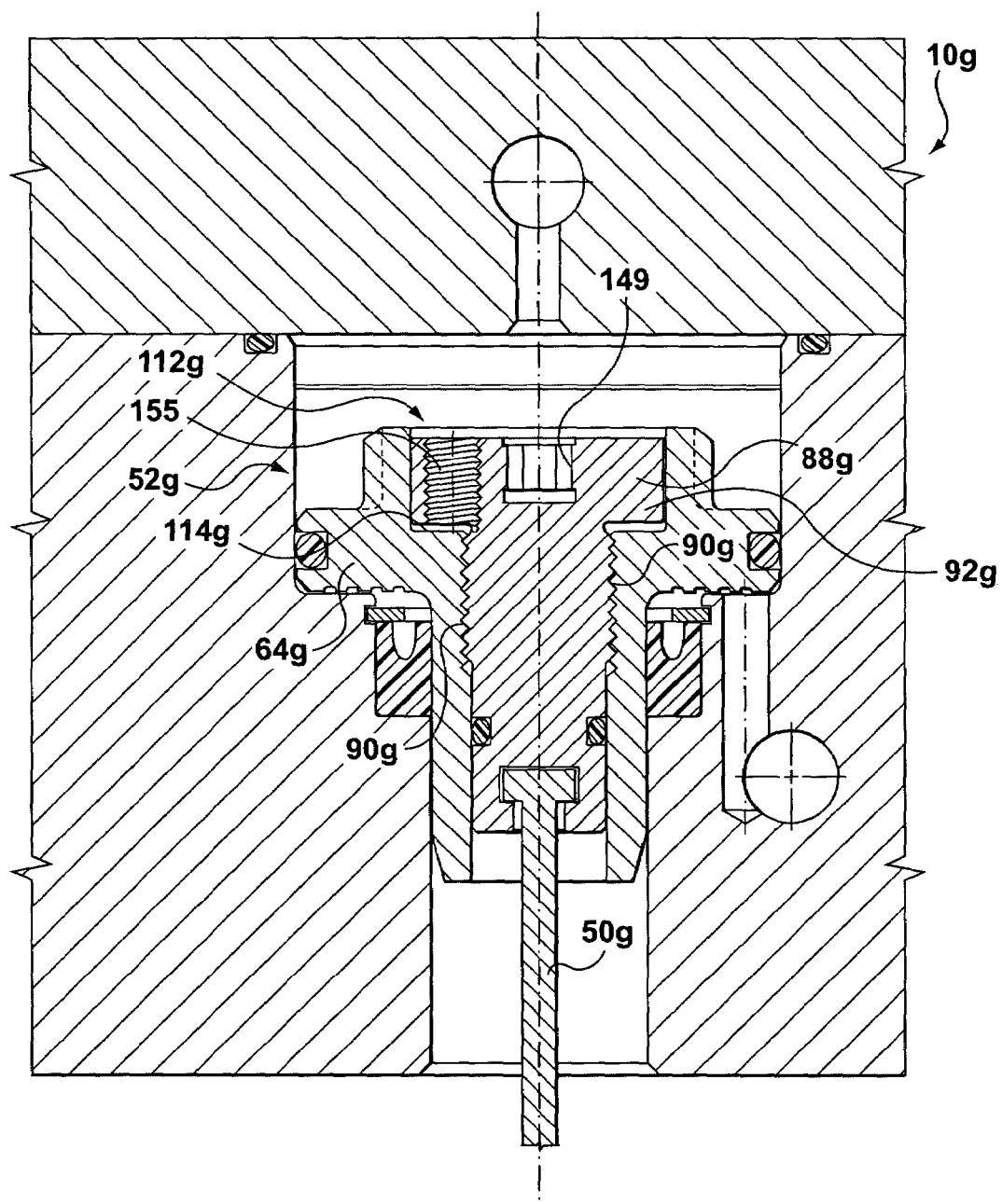
FIG. 21 is a side sectional view of a portion of an injection molding apparatus according to another embodiment of the present invention.

An actuator 52*g* of another embodiment of an injection molding apparatus 10*g* of the present invention is shown in FIG. 21. Valve pin 50*g* may be coupled directly to an adjustment piece 88*g*. As such, routine maintenance will require removal of valve pin 50*g* along with removal of the adjustment piece 88*g*, but actuator 52*g* will have fewer parts providing for a more simple construction and a lower cost. Further, adjustment piece 88*g*, as shown in FIG. 21, does not extend beyond piston 64*g*. As such, actuator 52*g* does not feature an anti-rotation device. Thus, either adjustment piece 88*g* or piston 64*g* may be rotated in order to axially move adjustment piece 88*g* with respect to piston 64*g* along threaded connection 90*g*. However, it may require a first tool (not shown) to hold one of piston 64*g* and adjustment piece 88*g* in place while turning the other. Adjustment piece 88*g* includes a recess 149 to engage such a tool. In another embodiment, piston 64*g* may include an anti-rotation device to inhibit rotation of piston 64*g* with respect to a cylinder (not shown).

FIGS. 19 and 21 illustrate another locking device 112*g*. A threaded bore 155 is drilled through enlarged portion 92*g* of adjustment piece 88*g*. A bolt 157 (shown in FIG. 19), is threaded into threaded bore 155 and set against upper surface 114*g* of piston 64*g* to hold adjustment piece 88*g* from rotating with respect to piston 64*g*. In alternative embodiments, upper surface 114*g* of piston 64*g* may have a number of bores or a groove therein into which bolt 157 may be threaded to engage both piston 64*g* and adjustment piece 88*g*.

Another embodiment (not shown) is similar to the embodiment shown in FIGS. 4 and 5 except that an adjustment piece and a connector may be combined into a single unitary structure. This structure will be threaded with a piston, coupled with a valve pin, and include an anti-rotation device, similar to anti-rotation devices 71, as discussed above with respect to FIGS. 4 and 5. Thus, upon disassembly, the operator is not provided with an option of removing the valve pin; the valve pin must be removed. However, the anti-rotation device ensures that it will be properly positioned upon reassembly of the actuator.

Referring to FIGS. 22 to 26, another embodiment of an actuator 52*h* is shown. Actuator 52*h* may be used in an injection molding apparatus that is similar to injection molding apparatus 10 of FIG. 1. Actuator 52*h* includes a piston 64*h* that is slidable in a cylinder (not shown). Piston 64*h* includes a head portion 65*h*, a rod portion 84*h*, a large bore 87*h* and a small bore 86*h*. Large bore 87*h* and small bore 86*h* are coaxial and extend through the axial length of piston 64*h*. An O-ring 85*h* surrounds head portion 65*h* to provide a seal between piston 64*h* and the cylinder. An adjustment piece 88*h* includes a rod portion 91*h* and an enlarged portion 92*h*. Rod portion 91*h* is received in small bore 86*h* of piston 64*h* and is coupled thereto by a threaded connection 90*h*, while enlarged portion 92*h* is received in large bore 87*h* of piston 64*h*.

A connector 98*h* includes a first end 100*h* that is partially received in rod portion 84*h* of piston 64*h* and abuts an end surface 102*h* of adjustment piece 88*h*. A fastener 104*h*, such as a bolt, extends through a bore 89*h* in adjustment piece 88*h* and engages connector 98*h* at a threaded connection 97*h* to firmly couple connector 98*h* to adjustment piece 88*h*. Connector 98*h* further includes a valve pin-receiving portion 106*h*, which is sized to receive a head 51*h* of valve pin 50*h*. A head securing nut 108*h* is provided to secure valve pin head 51*h* to connector 98*h* so that as piston 64*h* moves, adjustment piece 88*h*, connector 98*h* and valve pin 50*h* are movable along with piston 64*h* as a single unit. An o-ring 110*h* surrounds first end 100*h* of connector 98*h* to provide a seal between piston 64*h* and connector 98*h* as they move with respect to one another and to prevent leakage of hydraulic fluids or pneumatic air from piston 64*h* and cylinder operation.

A rod seal 122*h* surrounds rod portion 84*h* of piston 64*h*. Rod seal 122*h* is provided to generally prevent leakage of hydraulic fluid or pneumatic air from the cylinder. A retaining ring 124*h* is provided to maintain rod seal 122*h* in place relative to the cylinder.

Figure 22:
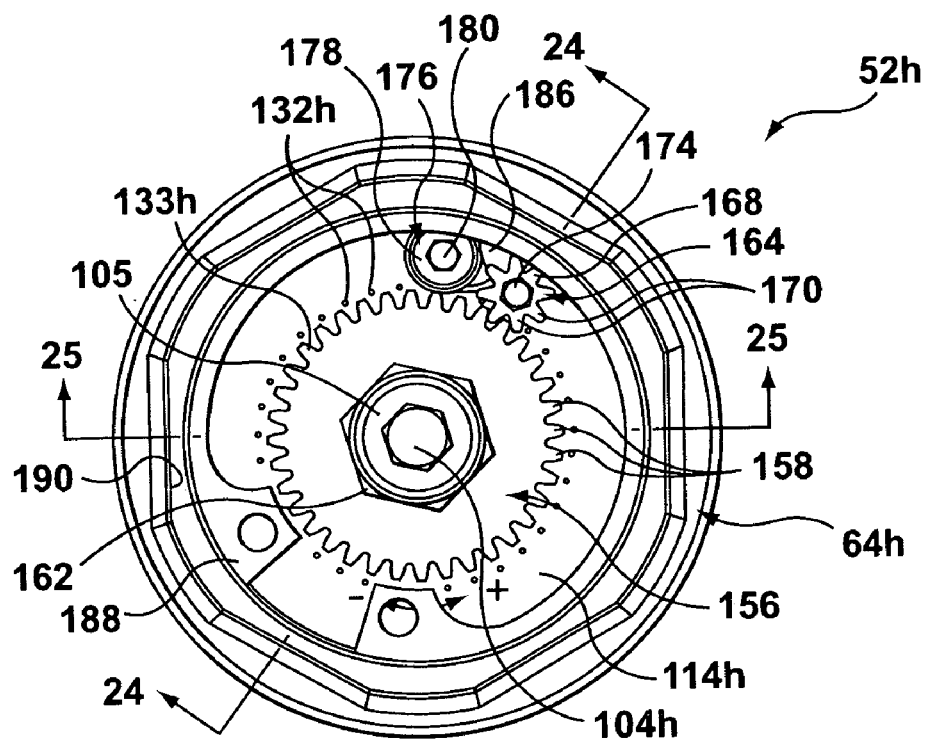
FIG. 22 is a top view of a portion of an injection molding apparatus according to another embodiment of the present invention showing a locking device in a locked position.
Figure 23:
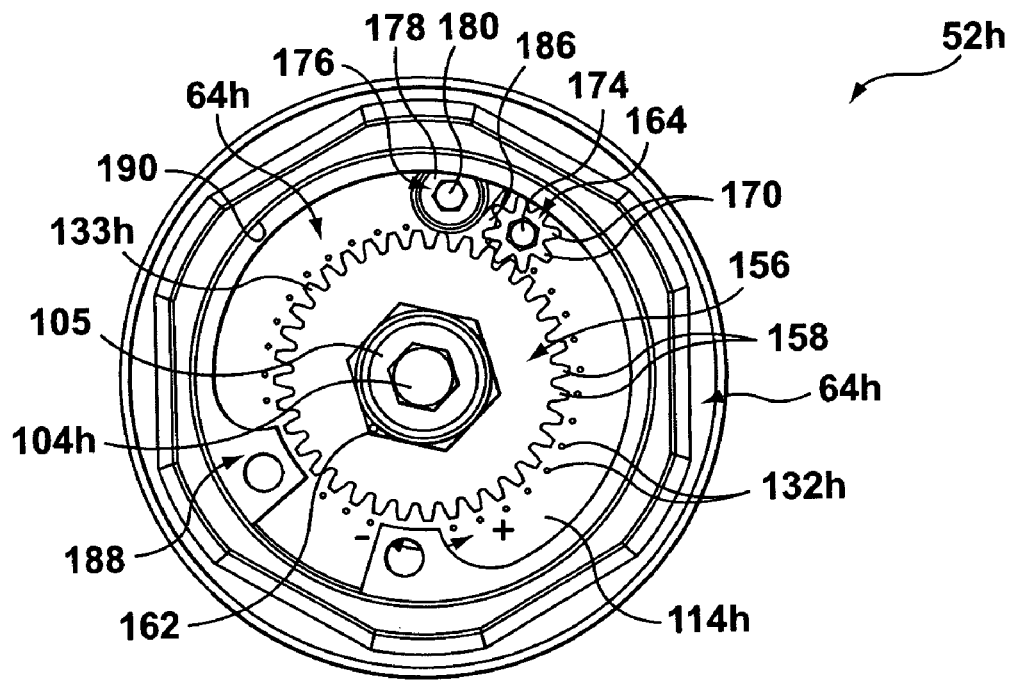
FIG. 23 is a top view similar to FIG. 22 showing the locking device in an unlocked position.
Figure 26:
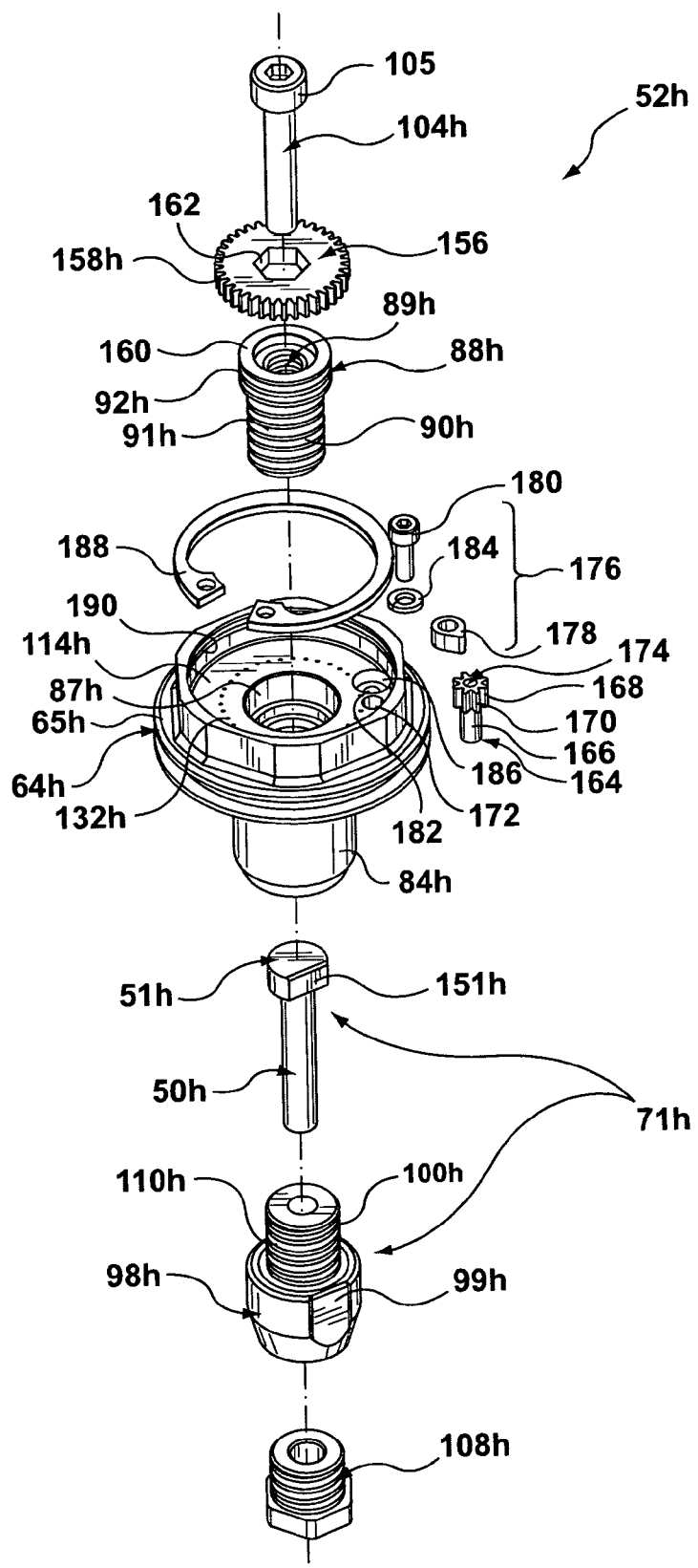
FIG. 26 is an exploded view of portions of the injection molding apparatus of FIGS. 22-25.

A main gear 156 having a plurality of teeth 158 abuts an upper surface 160 of adjustment piece 88*h*. Main gear 156 is welded to adjustment piece 88*h* to allow rotation of main gear 156 to cause rotation of adjustment piece 88*h* with respect to piston 64*h*. Main gear 156 may alternatively be coupled to adjustment piece 88*h* by another suitable means. Main gear 156 further includes a bore 162 that is sized to allow a head 105 of fastener 104*h* to pass therethrough. Bore 162 as shown in FIGS. 22, 23 and 26 has a polygonal shape, however, bore 162 may alternatively have another suitable shape. One of the plurality of teeth 158 of main gear 156 includes a locating mark 133*h* for gauging movement of main gear 156 relative to gradation marks 132*h*, which are provided on the upper end surface 114*h* of piston 64*h*. As indicated on the upper end surface 114*h*, movement between adjacent gradation marks 132*h* is equal to an axial distance of 0.027 mm. It will be appreciated by a person skilled in the art that the amount of axial movement per gradation mark 132*h* may be adjusted to suit any application.

An adjustment gear 164 includes a shaft 166 and a head 168 having a plurality of teeth 170. Shaft 166 is received in a first aperture 172, which is provided in an upper end surface 114*h* of piston 64*h*, and is free to rotate. Adjustment gear 164 is located adjacent main gear 156 to allow teeth 170 of adjustment gear 164 to engage teeth 158 of main gear 156 so that rotation of adjustment gear 164 forces main gear 156 to rotate with respect to adjustment gear 164, or adjustment gear 164 to revolve around main gear 156. A tool-receiving recess 174 is provided in head 168 of adjustment gear 164. Tool-receiving recess 174 allows an operator to rotate adjustment gear 164 using a suitable tool. In the embodiment shown, one full rotation of adjustment gear 164 causes main gear 156 to rotate about a half rotation. Unlike the previous embodiments, the range of adjustment is not limited to less than one full turn of adjustment piece 88h.

A locking cam assembly 176 is provided to selectively restrict rotation of adjustment gear 164, which in turn restricts rotation of main gear 156. Locking cam assembly 176 is shown in FIG. 26 and includes a locking cam 178, which is coupled to piston 64h by a screw 180. Screw 180 is threaded into in a second aperture 182, which is provided in upper end surface 114h of piston 64h. A washer 184 is provided between locking cam 178 and screw 180. A recess 186 is formed in upper end surface 114h of piston 64h. Recess 186 is shaped to receive locking cam 178 and allow for movement of locking cam 178 between a locked position and an unlocked position. In the locked position, which is shown in FIG. 22, locking cam 178 engages teeth 170 of adjustment gear 164 to generally prevent rotation of adjustment gear 164. In the unlocked position, which is shown in FIG. 23, locking cam 178 is rotated out of engagement with teeth 170 to allow adjustment gear 164 to rotate.

A retainer 188 is provided at the upper end of piston 64h to restrict the distance that screw 180 of locking cam assembly 176 may be unscrewed and to maintain shaft 166 of adjustment gear 164 in first aperture 172. Retainer 188 is received under a lip 190 of piston 64h, which is a fixed distance from locking cam assembly 176 and adjustment gear 164. Retainer 188 is flexible so that it may be deformed for placement underneath lip 190 then once in position, retainer 188 springs back to its original shape. Retainer 188 generally functions to maintain both adjustment gear 164 and locking cam assembly 176 in engagement with piston 64h to prevent the small parts from coming loose and damaging other components in the injection molding apparatus.

An anti-rotation device 71h is provided in actuator 52h to keep valve pin 50h in consistent rotational alignment with the mold gate (not shown). In order to generally prevent rotation of connector 98h relative to a collar 70h, anti-rotation device 71h includes a flat wall 99h of connector 98h abutting a flat inner wall portion 76h of collar 70h, which can be seen in FIG. 25. Flat wall 99h of connector 98h may slide axially with respect to wall portion 76h of collar 70h, but connector 98h will not rotate with respect to collar 70h. Further, in order to generally prevent rotation of collar 70h relative to back plate (not shown) of the injection molding apparatus, anti-rotation device 71h includes an aperture 75h in collar 70h that receives a first dowel 74h. First dowel 74h engages both the back plate and collar 70h. Therefore, rotation of connector 98h relative to the back plate is generally prevented.

Figure 25:
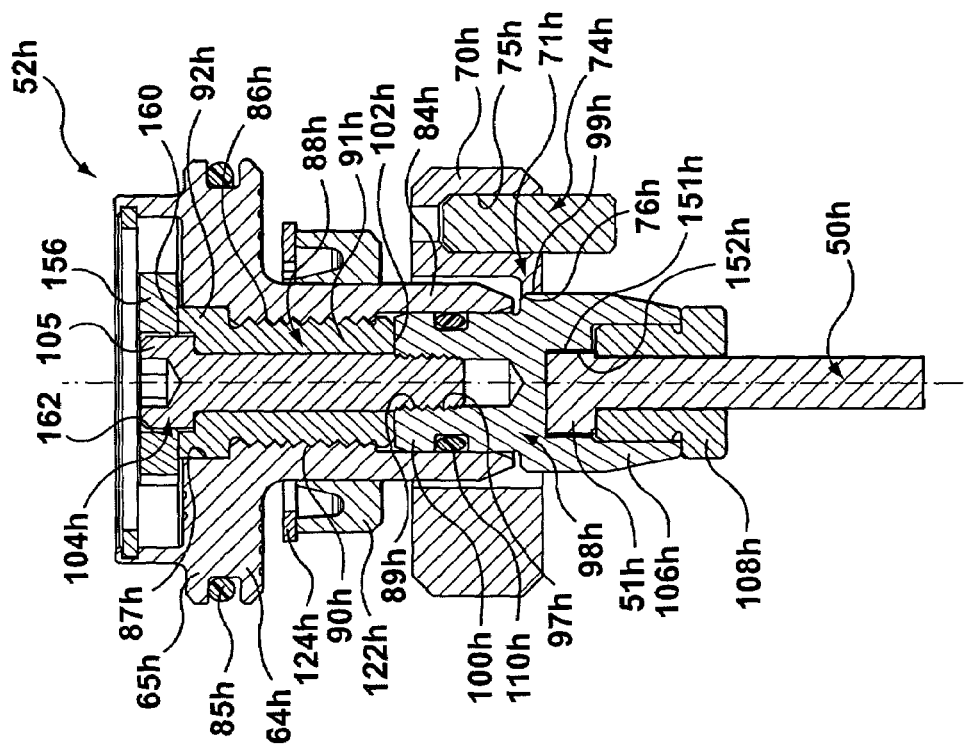
FIG. 25 is a cross-sectional view taken along line 25-25 of FIG. 22.
Figure 24:
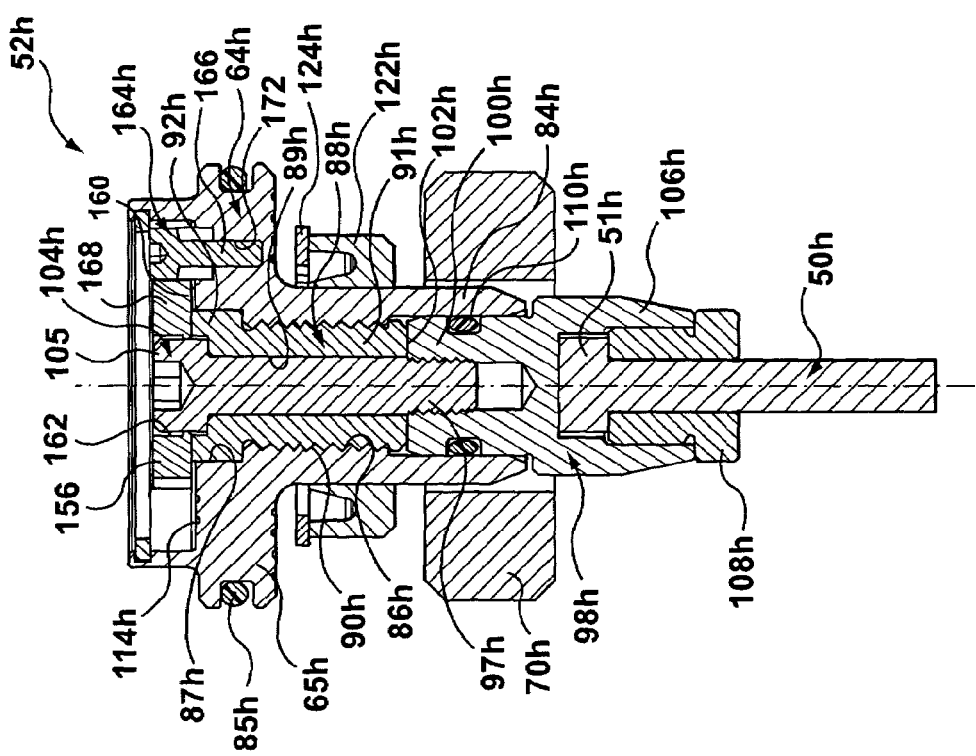
FIG. 24 is a cross-sectional view taken along line 24-24 of FIG. 22.

Another feature of anti-rotation device 71h is the shape of valve pin head 51h. Valve pin head 51h is a generally circular pin head, except for a flat surface 151h, as shown in FIG. 25, which abuts a flat inside surface 152h of connector 98h. Flat surface 151h prevents valve pin 50h from rotating within connector 98h.

In order to adjust the axial position of valve pin 50h, screw 80 of locking cam assembly 176 is loosened and locking cam 178 is rotated from the locked position of FIG. 22 to the unlocked position of FIG. 23. The operator then uses a tool to engage tool-receiving recess 174 of adjustment gear 164 and rotates adjustment gear 164 a desired amount. Rotation of adjustment gear 164 causes piston 64h to rotate with respect to main gear 156, which in turn rotates piston 64h with respect to adjustment piece 88h. Similar to the other embodiments, adjustment piece 88h is threaded against piston 64h and coupled to valve pin 50h through connector 98h. Therefore, adjustment piece 88h and therefore valve pin 50h moves axially with respect to piston 64h in response to rotation of adjustment gear 164. Once the operator has finished adjusting the axial position of valve pin 50h, locking cam 178 is rotated back to the locked position and screw 180 is tightened to maintain locking cam 178 in the locked position.

In some cases, the operator may be unable to see the upper end surface 114h of piston 64h and therefore may not be able to use gradation marks 132h for reference. In this embodiment, one half turn of adjustment gear 164 causes piston 64h to move a quarter turn. Because a large rotation of adjustment gear 164 translates into a small rotation of main gear 156, fine adjustments can be made easily by the operator without referring to gradation marks 132h.

Referring to FIGS. 27 to 32, another embodiment of an actuator 52i is shown. Actuator 52i may be used in an injection molding apparatus that is similar to the injection molding apparatus 10 of FIG. 1. Actuator 52i includes a piston 64i that is slidable in a cylinder (not shown). Piston 64i includes a head portion 65i, a rod portion 84i, a large bore 87i and a small bore 86i. Large bore 87i and small bore 86i are coaxial and extend through the axial length of piston 64i. An O-ring 85i surrounds head portion 65i to provide a seal between piston 64i and the cylinder. An adjustment piece 88i includes a rod portion 91i and an enlarged portion 92i. Rod portion 91i is received in small bore 86i of piston 64i and is coupled thereto by a threaded connection 90i, while enlarged portion 92i is received in large bore 87i of piston 64i.

A connector 98i includes a first end 100i that is partially received in rod portion 84i of piston 64i. A fastener 104i, such as a bolt, extends through a bore 89i in adjustment piece 88i and engages connector 98i at a threaded connection 97i to firmly couple connector 98i to adjustment piece 88i. Connector 98i further includes a valve pin-receiving portion 106i, which is sized to receive a head 51i of valve pin 50i. A head securing nut 108i is provided to secure valve pin head 51i to connector 98i so that as piston 64i moves, adjustment piece 88i, connector 98i and valve pin 50i are movable along with piston 64i as a single unit. An o-ring 110i surrounds first end 100i of connector 98i to provide a seal between piston 64i and connector 98i as they move with respect to one another and to prevent leakage of hydraulic fluids or pneumatic air from piston 64i and cylinder operation.

A rod seal 122i surrounds rod portion 84i of piston 64i. Rod seal 122i is provided to generally prevent leakage of hydraulic fluid or pneumatic air from the cylinder. A retaining ring 124i is provided to maintain rod seal 122i in place relative to the cylinder. upper end surface 114i of piston 64i. Locking gear 194 includes a plurality of teeth 195, which can be seen in FIGS. 27 and 28, for engaging teeth 158i of main gear 156i. When screw 196 is loosened, locking gear 194 is free to rotate with main gear 156i and when screw 196 is tightened, locking gear 194 is restricted from rotating, which, in turn, restricts main gear 156i from rotating.

A retainer 188i is provided at the upper end of the piston 64i to restrict the distance that screw 196 of locking gear assembly 192 may be unscrewed and to maintain shaft 166i of adjustment gear 164i in first aperture 172i. Retainer 188i is received under a lip 190i of piston 64i, which is a fixed distance from locking gear assembly 192 and adjustment gear 164i. Retainer 188i is flexible so that it may be deformed for placement underneath lip 190i then once in position, retainer 188i springs back to its original shape. Retainer 188i generally functions to maintain both adjustment gear 164i and locking gear assembly 192 in engagement with piston 64*i* to prevent the small parts from coming loose and damaging other components in the injection molding apparatus.

Figure 30:
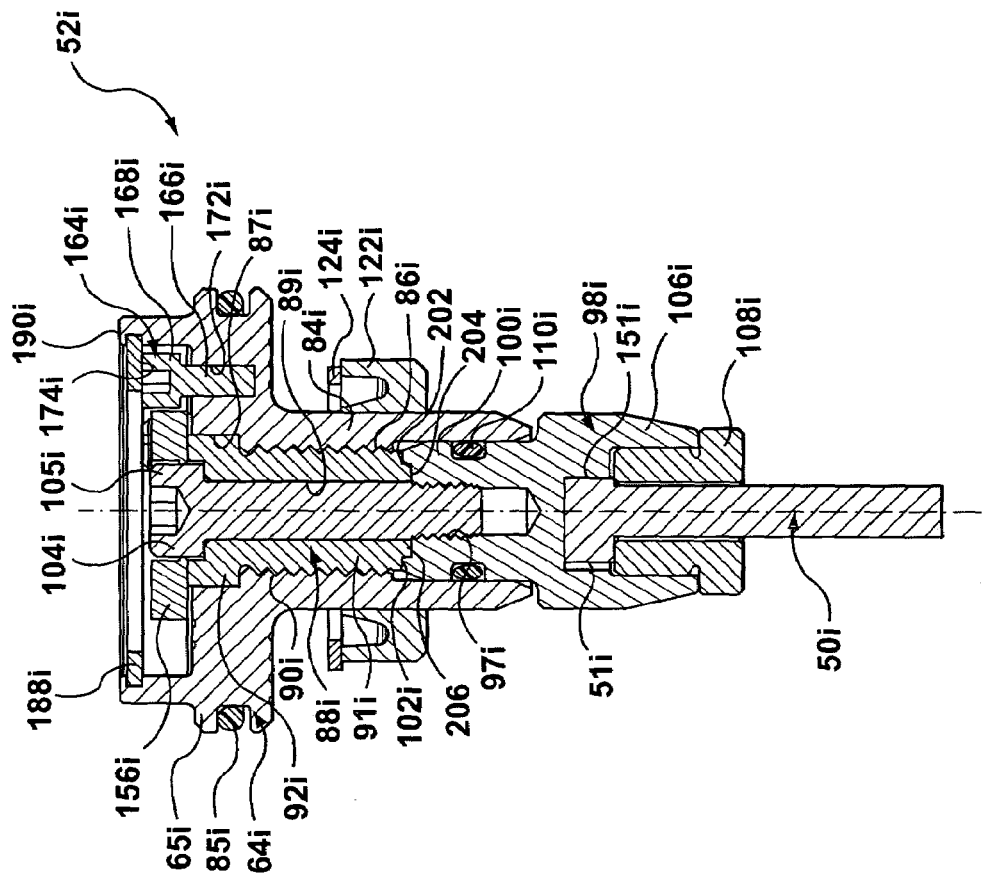
FIG. 30 is a cross-sectional view taken along line 30-30 of FIG. 28.
Figure 29:
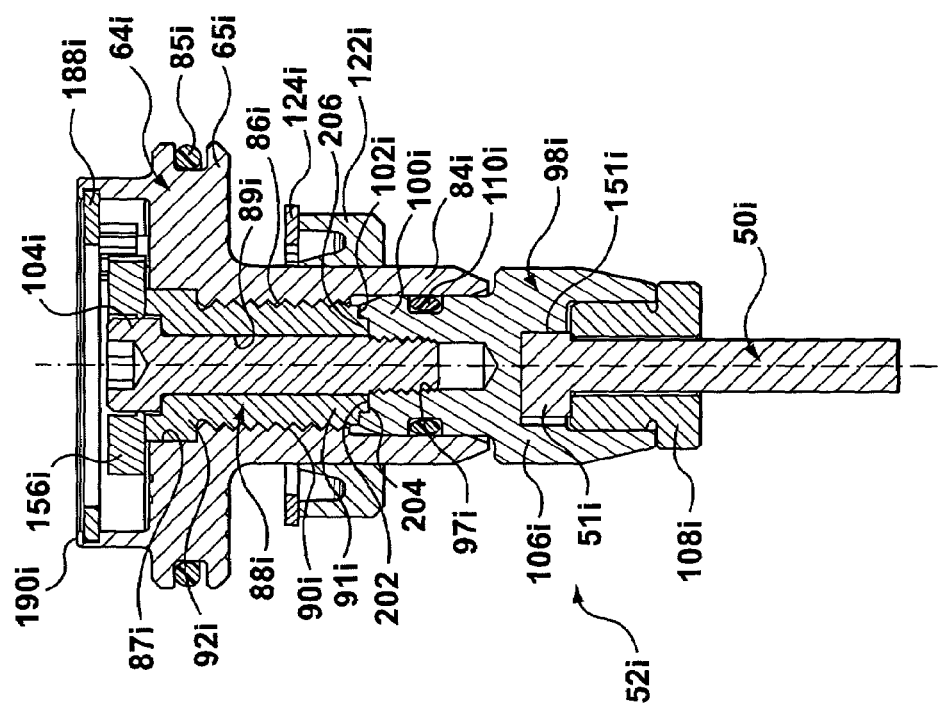
FIG. 29 is a cross-sectional view taken along line 29-29 of FIG. 28.
Figure 32:
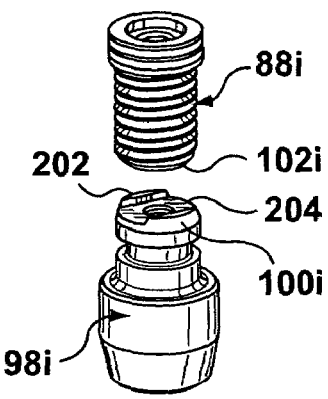
FIG. 32 is an exploded isometric view of portions of the injection molding apparatus of FIG. 27.

As will be described, connector 98*i* rotates in a controlled manner with adjustment piece 88*i* and valve pin 50*i* rotates relative to mold gate (not shown), as this embodiment does not include an anti-rotation feature. As shown in FIGS. 29, 30 and 32, first end 100*i* of connector 98*i* includes a mating surface 202 having a slot 204. Slot 204 is sized to receive a projection 206, which extends from an end surface 102*i* of adjustment piece 88*i*. Engagement between slot 204 and projection 206 causes connector 98*i* to rotate along with adjustment piece 88*i*. Valve pin 50*i* also rotates with connector 98*i* and adjustment piece 88*i* because valve pin head 51*i* includes a flat surface 151*i* that prevents valve pin 50*i* from rotating within connector 98*h*.

Figure 27:
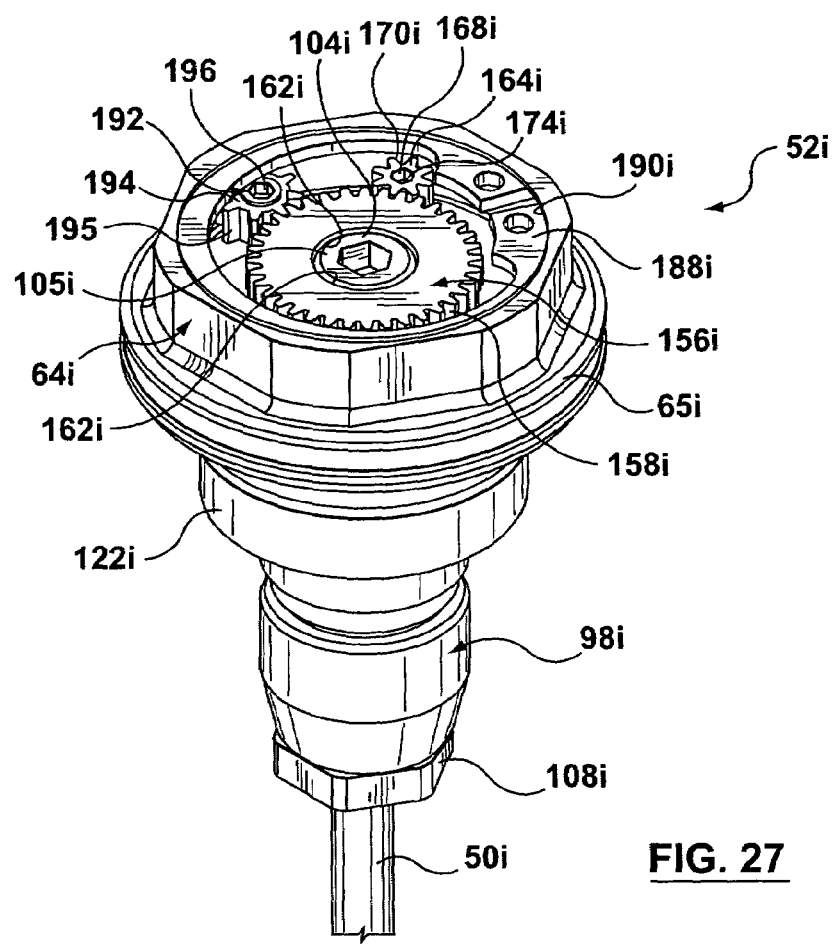
FIG. 27 is an isometric view of a portion of an injection molding apparatus according to another embodiment of the present invention.
Figure 28:
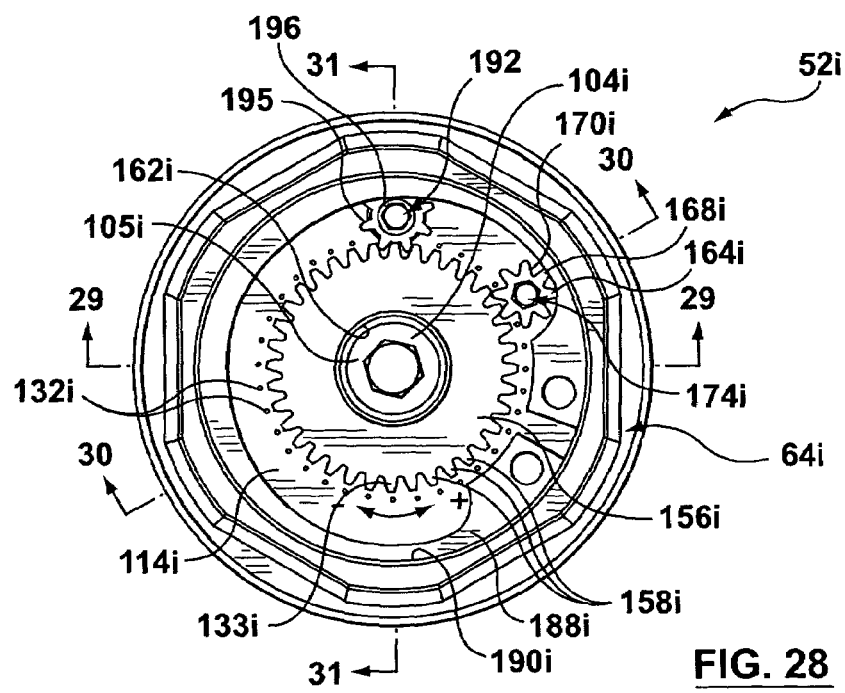
FIG. 28 is a top view of FIG. 27.
Figure 31:
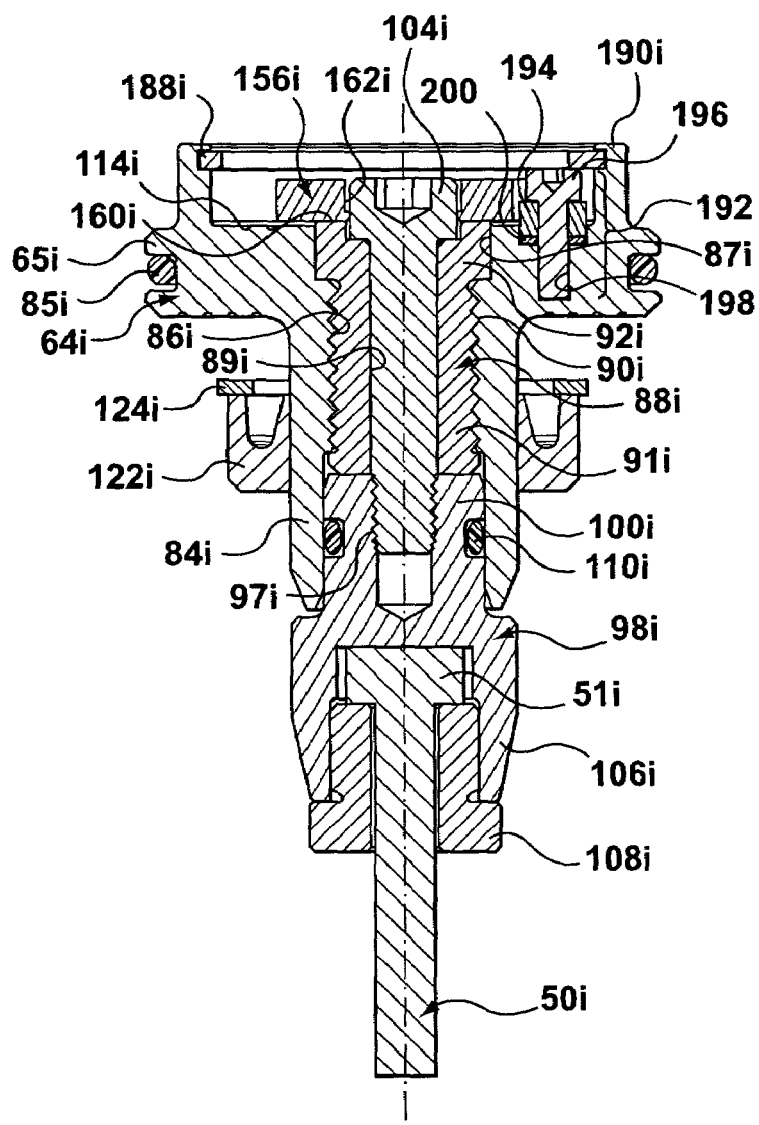
FIG. 31 is a cross-sectional view taken along line 31-31 of FIG. 28.

It will be appreciated by a person skilled in the art that, in any of the previously described embodiments, the anti-rotation collar may be removed and slot 204 and projection 206 may be incorporated, as described with As is best shown in FIGS. 27, 28 and 31, a main gear 156*i* having a plurality of teeth 158*i* abuts an upper surface 160*i* of adjustment piece 88*i*. Main gear 156*i* is welded to adjustment piece 88*i* to allow rotation of main gear 156*i* to cause rotation of adjustment piece 88*i* with respect to piston 64*i*. Main gear 156*i* may alternatively be coupled to adjustment piece 88*i* by another suitable means. Main gear 156*i* further includes a bore 162*i* that is sized to allow a head 105*i* of fastener 104*i* to pass therethrough. One of the plurality of teeth 158*i* of main gear 156*i* includes a locating mark 133*i* for gauging movement of main gear 156*i* relative to gradation marks 132*i*, which are provided on upper end surface 114*i* of piston 64*i*. As indicated on upper end surface 114*i*, movement between adjacent gradation marks 132*i* is equal to an axial distance of 0.027 mm. It will be appreciated by a person skilled in the art that the amount of axial movement per gradation mark 132*i* may be adjusted to suit any application.

An adjustment gear 164*i* includes a shaft 166*i*, which is shown in FIG. 30, and a head 168*i* having a plurality of teeth 170*i*. Shaft 166*i* is received in a first aperture 172*i*, which is provided in upper end surface 114*i* of piston 64*i*, and is free to rotate. Adjustment gear 164*i* is located adjacent main gear 156*i* to allow teeth 170*i* of adjustment gear 164*i* to engage teeth 158*i* of main gear 156*i* so that rotation of adjustment gear 164*i* forces main gear 156*i* to rotate with respect to adjustment gear 164*i*, or adjustment gear 164*i* to revolve around main gear 156*i*. A tool-receiving recess 174*i* is provided in head 168*i* of adjustment gear 164*i*. Tool-receiving recess 174*i* allows an operator to rotate adjustment gear 164*i* using a suitable tool. In the embodiment shown, one full rotation of adjustment gear 164*i* causes main gear 156*i* to rotate about a half rotation.

A locking gear assembly 192 is provided to selectively restrict rotation of adjustment gear 164*i*. As shown in FIG. 31, locking gear assembly 192 includes a locking gear 194 that is coupled to piston 64*i* by a screw 196. Screw 196 is received in a second aperture 198, which is provided in upper end surface 114*i*. A washer 200 is located between locking gear 194 and respect to FIGS. 27 to 32. Likewise, anti-rotation device 71 of the previous embodiments may be incorporated into the embodiment of FIGS. 27 to 32.

In order to adjust the axial position of valve pin 50*i*, screw 196 of locking gear assembly 192 is loosened to allow locking gear 194 to rotate freely. The operator then uses a tool to engage tool-receiving recess 174*i* of adjustment gear 164*i* and rotates adjustment gear 164*i* a desired amount. One skilled in the art can appreciate that, without an anti-rotation feature, piston 64*i*, main gear 156*i*, or both, may be moved by rotating adjustment gear 164*i*, provided that main gear 156*i* and piston 64*i* rotate in opposite directions with respect to each other, or provided that one of main gear 164*i* and piston 54*i* be held in place. Rotation of adjustment gear 164*i* causes main gear 156*i* to rotate with respect to piston 64*i*, which in turn rotates adjustment piece 88*i* with respect to piston 64*i*. Adjustment piece 88*i* is coupled to valve pin 50*i* through connector 98*i* and therefore valve pin 50*i* moves axially in response to rotation of adjustment gear 164*i*. Once the operator has finished adjusting the axial position of valve pin 50*i*, screw 196 is tightened to restrict movement of locking gear 194 and therefore restrict movement of main gear 156*i*.

In some cases, the operator may be unable to see the upper end surface 114*i* of piston 64*i* and therefore may not be able to use gradation marks 132*i* for reference. In this embodiment, one half turn of the adjustment gear 164*i* causes main gear 156*i* to move a quarter turn. Because a large rotation of adjustment gear 164*i* translates into a small rotation of main gear 156*i*, fine adjustments can be made easily by the operator without referring to gradation marks 132*i*.

Figure 33:
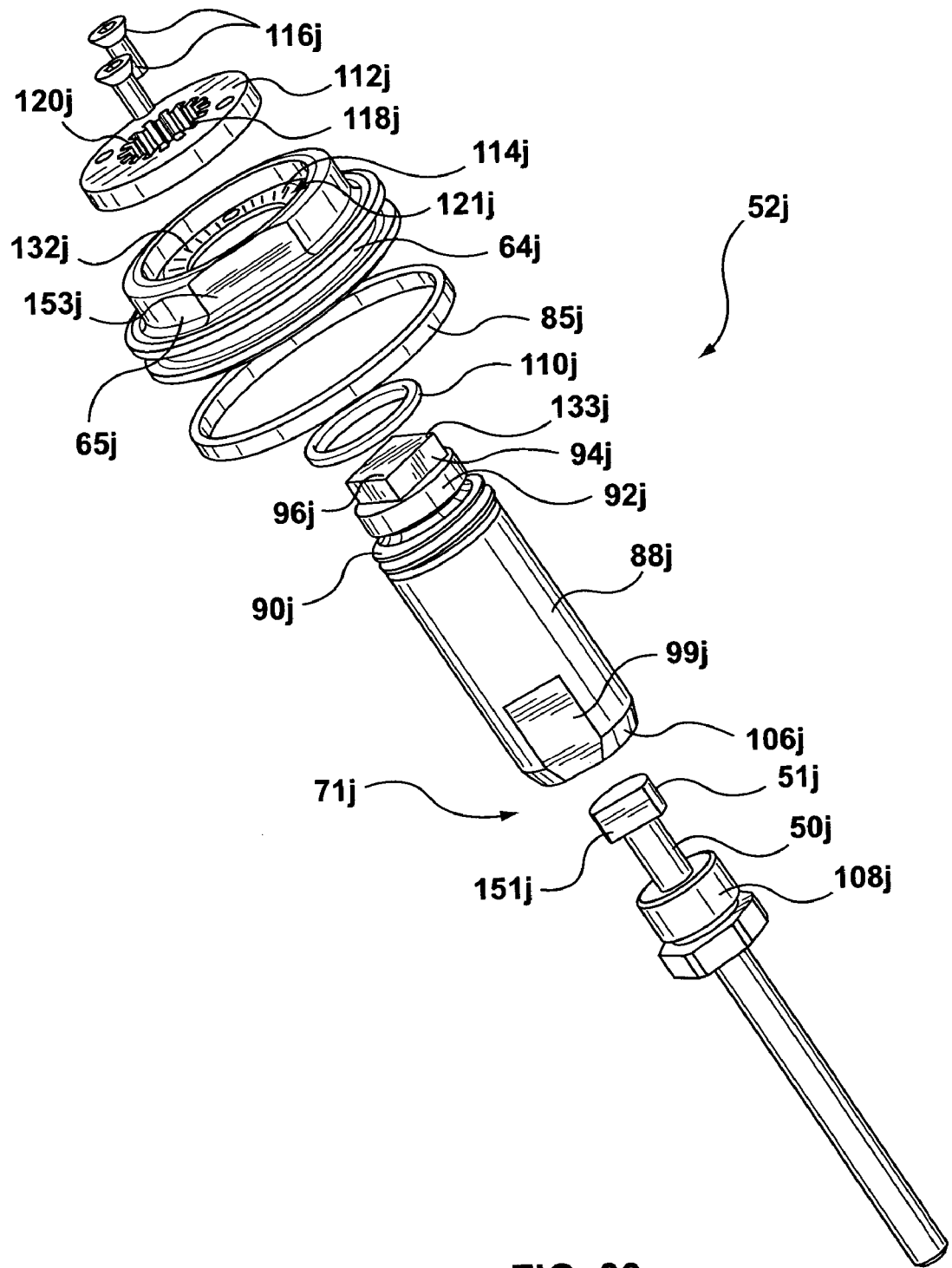
FIG. 33 is an exploded view of portions of an alternative injection molding apparatus.
Figure 34:
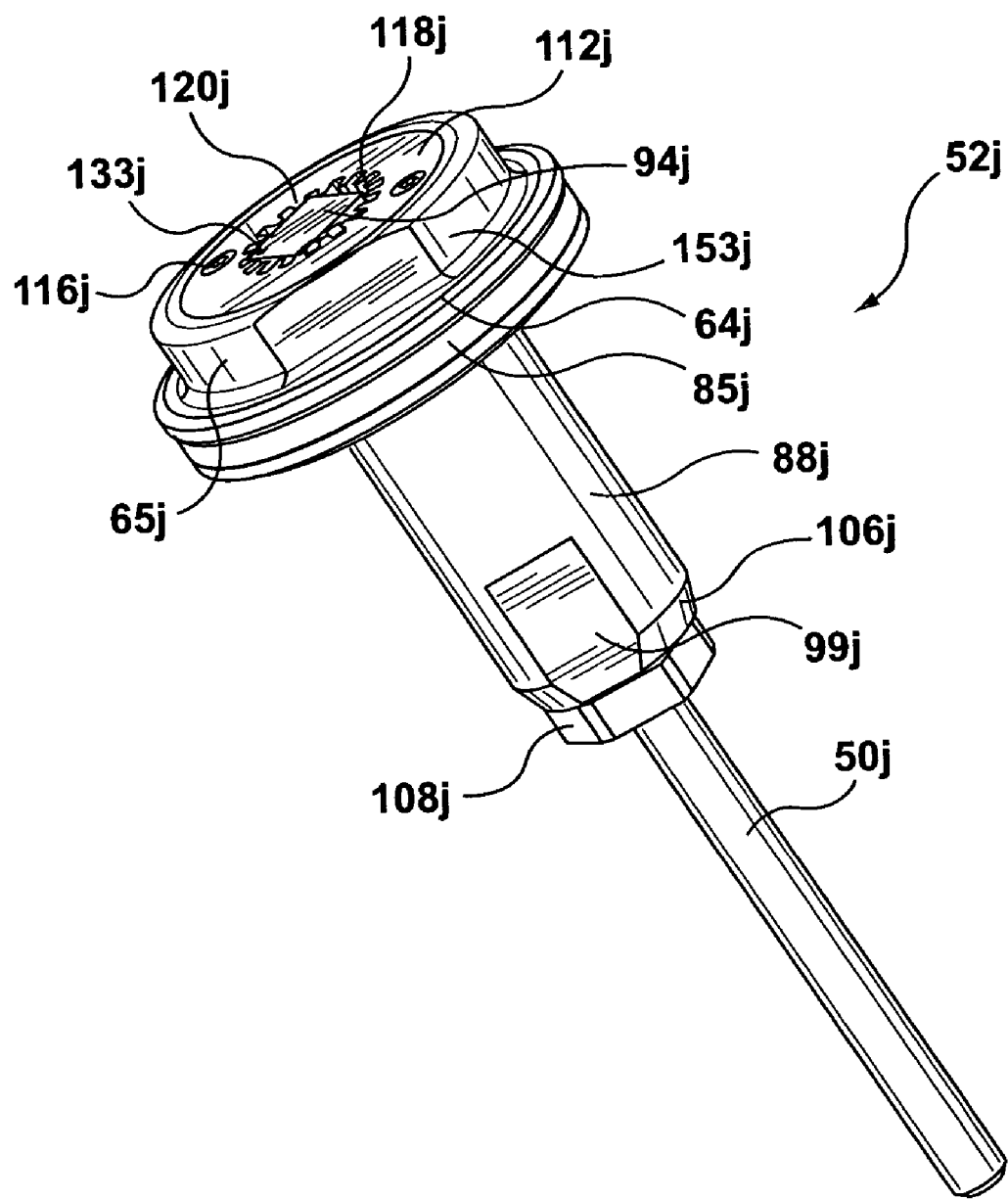
FIG. 34 is an isometric view of the portion of the injection molding apparatus of FIG. 33.

Referring to FIGS. 33 and 34, another embodiment of an actuator 52*j* is shown. The actuator 52*j* may be used in an injection molding apparatus, similar to injection molding apparatus 10 of FIG. 1. Actuator 52*j* includes a piston 64*j* that is slidable within a cylinder (not shown), similar to cylinders 66 or 66*a* of the preceding embodiments.

Piston 64*j* includes a head portion 65*j*; however, piston 64*j* does not have a rod portion, as shown in previous embodiments. Piston 64*j* includes a large bore (not shown) and a small bore (not shown) similar to large bore 87*a* and mid-sized bore 83*a* of actuator 52*a*. An adjustment piece 88*j* is received in the small bore and is coupled thereto by a threaded connection 90*j*. Adjustment piece 88*j* includes an enlarged portion 92*j*, which is received by the large bore and is provided between threaded connection 90*j* and a flange 94*j*. Flange 94*j* has a generally polygonal-shaped cross-section including corners 96*j*. A square-shaped flange 94*j* with four right corners 96*j* is illustrated in FIGS. 33 and 34.

Piston 64*j* and adjustment piece 88*j* function the same as previously described, for example with respect to piston 64*a* and adjustment piece 88*a* in actuator 52*a*. Actuator 52*j*, however, requires less pieces as it does not have a connector piece or a fastener to connect the connector piece to adjustment piece 88*j*. Instead, adjustment piece 88*j* has a valve pin-receiving portion 106*j*, which is sized to receive a head 51*j* of valve pin 50*j*. A head securing nut 108*j* is provided to secure valve pin head 51*j* to adjustment piece 88*j* so that as piston 64*j* moves, adjustment piece 88*j* and valve pin 50*j* are movable along with piston 64*j* as a single unit.

Enlarged head portion 92*j* of adjustment piece 88*j* is spaced from a locking device 112*j* which may include similar limitations, such as those discussed above with respect to actuator 52*a* such that piston 64*j* cannot be rotated more that 90% of a full turn. Piston 64*j* may also include an indicator 121*j* including gradation marks 132*j* and a locating mark 133*j* on flange 94*j*, or any of the other indicators previously described.

Actuator 52*j* includes an anti-rotation device 71*j*. Anti-rotation device 71*j* includes a flat wall 99*j* of adjustment piece 88*j* that abuts a flat end surface, such as flat end surface 76 of collar 70 of FIG. 4, to generally prevent rotation of adjustment piece 88*j* relative to the collar. Another feature of anti-rotation device 71*j* is the shape of valve pin head 51*j*. Valve pin head 51*j* is a generally circular pin head, except for a flat surface 151*j*, as shown in FIG. 33, which abuts a flat inside surface (not shown) of adjustment piece 88*j* to prevent valve pin 50*j* from rotating within adjustment piece 88*j*.

Locking device 112*j* is also a sleeve that abuts an upper end surface 114*j* of piston 64*j* and is secured thereto by fasteners 116j. As shown in FIG. 33, locking device 112j includes a cutout 118j having teeth 120j. Cutout 118j surrounds flange 94j of adjustment piece 88j and teeth 120j engage corners 96j thereof, as shown the assembled actuator 52j in FIG. 32. Therefore, rotation of adjustment piece 88j with respect to piston 64j is restricted when locking device 112j is in position.

Similar to the previous embodiment, actuator 52j includes o-rings 85j and 110j, which are provided for sealing purposes. Adjustment of the position of the valve pin 50j relative to the mold gate is accomplished by removing locking system 112j, turning piston 64j via flange 153j so as to turn piston 64j with respect to adjustment piece 88j, which does not rotate due to anti-rotation device 71j. As piston 64j turns, adjustment piece 88j, which is threaded to piston 64j, slides axially raising or lowering valve pin 50j with respect to piston 64j.

Further, during disassembly of the actuator 52j, piston 64j, adjustment piece 88j and valve pin 50j may be removed as a single unit, in the same manner as has been previously described. However, valve pin 50j may not be uncoupled from adjustment piece 88j, but instead must be removed with piston 64j and adjustment piece 88j.

Figure 35:
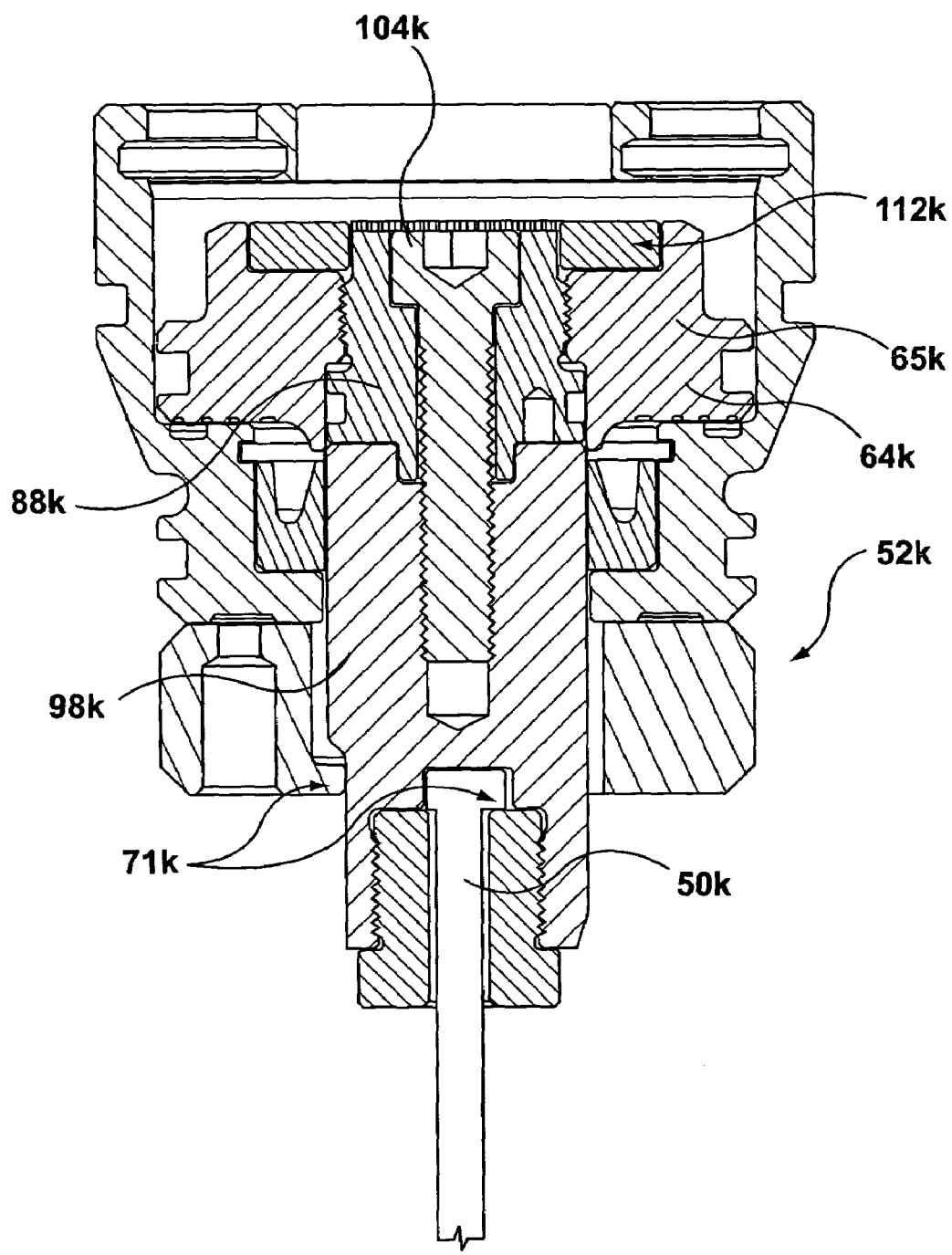
FIG. 35 is a side sectional view of a portion of an injection molding apparatus according to another embodiment of the present invention.

FIG. 35 illustrates another embodiment of an actuator 52k. Actuator 52k includes a piston 64k having a head portion 65k but no rod portion as shown in previous embodiments. However, unlike actuator 52j disclosed above, actuator 52k includes an adjustment piece 88k and a connector 98k held together by a fastener 104k. Piston 64k, adjustment piece 88k, connector 98k and fastener 104k all function as previously described with respect to disassembly of piston 64k and axial adjustment of valve pin 50k. Also, actuator 52k includes an anti-rotation device 71k and a locking device 112k which function as described in previous embodiments.

Figure 36:
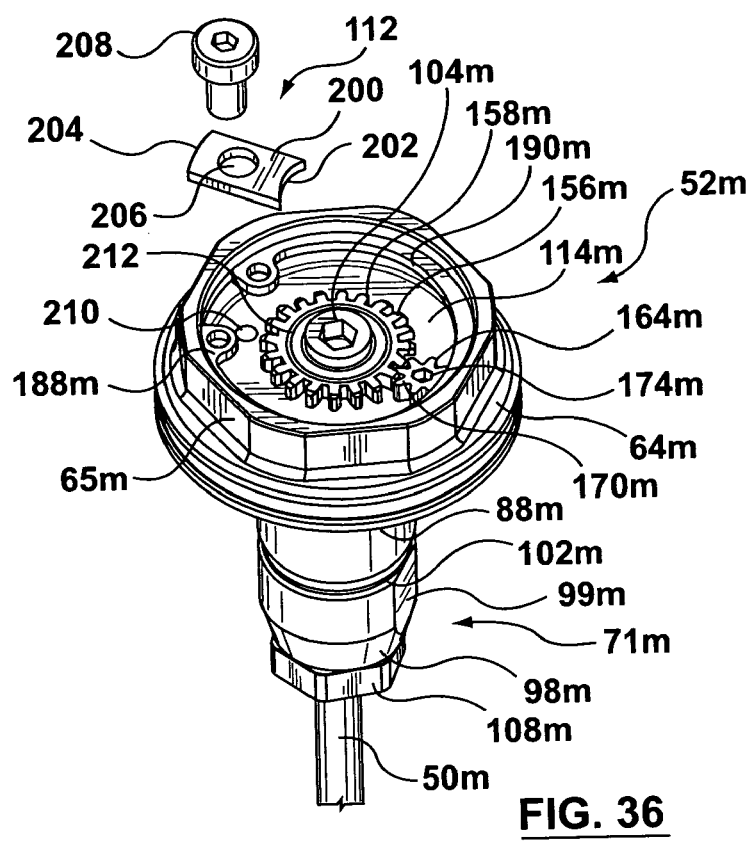
FIG. 36 is an exploded, isometric view of a portion of an injection molding apparatus according to another embodiment of the present invention.

Referring to FIG. 36, another embodiment of an actuator 52m is shown. Actuator 52m may be used in an injection molding apparatus that is similar to injection molding apparatus 10 of FIG. 1. Actuator 52m includes a piston 64m that is slidable in a cylinder (not shown). Piston 64m includes a head portion 65m, which slides within the cylinder. As discussed in the previous embodiments piston 64m is coupled to an adjustment piece 88m via a threaded connection. Also as discussed in previous embodiments, a connector 98m abuts an end surface 102m of adjustment piece 88m. A fastener 104m, such as a bolt, extends through adjustment piece 88m and engages connector 98m to firmly couple connector 98m to adjustment piece 88h. Connector 98m further receives a head (not shown) of valve pin 50m. A head securing nut 108m is provided to secure valve pin 50m to connector 98m so that as piston 64m moves, adjustment piece 88m, connector 98m and valve pin 50m are movable along with piston 64m as a single unit.

A main gear 156m having a plurality of teeth 158m is welded to adjustment piece 88m. Main gear 156m may alternatively be coupled to adjustment piece 88m by another suitable means. One of the plurality of teeth 158m of main gear 156m includes a locating mark 133m for gauging movement of main gear 156m relative to gradation marks 132m, which are provided on the upper end surface 114m of piston 64m. It will be appreciated by a person skilled in the art that the amount of axial movement per gradation mark 132m may be adjusted to suit any application.

An adjustment gear 164m includes a plurality of teeth 170m Adjustment gear is provided in upper end surface 114m of piston 64m, and is free to rotate. Adjustment gear 164m is located adjacent main gear 156m to allow teeth 170m of adjustment gear 164m to engage teeth 158m of main gear 156m so that rotation of adjustment gear 164m forces main gear 156m to rotate with respect to adjustment gear 164m, or adjustment gear 164m to revolve around main gear 156m. A tool-receiving recess 174m is provided in adjustment gear 164m. Tool-receiving recess 174m allows an operator to rotate adjustment gear 164m using a suitable tool. In the embodiment shown, one full rotation of adjustment gear 164m causes main gear 156m to rotate about a half rotation.

A locking device 112 is provided to selectively restrict rotation of main gear 156m, which in turn restricts rotation of adjustment gear 164m. Locking device includes a friction cam 200 which is relatively flat and includes a first curved end 202, a second curved end 204, and a first aperture 206 therein. A fastener 208, which may be a bolt or screw, is threaded into first aperture 206 of friction cam 200 and into a second aperture 210, which is provided in upper end surface 114m of piston 64m. First curved end 202 of friction cam 200 extends over an upper surface 214 of main gear 156m and has a radius of curvature such that access to fastener 104m is not obstructed by friction cam 200. A retainer 188m is provided at the upper end of piston 64m to restrict the lateral or radial movement of friction cam 200. Second curved end 204 of friction cam 200 is positioned under a lip 190m of piston 64m and includes a radius of curvature that is about equal to the radius of curvature of lip 190m. Retainer 188m is also received under lip 190m of piston 64m, which is a fixed distance from main gear 156m. Retainer 188m is flexible so that it may be deformed for placement underneath lip 190m. Once in position, retainer 188m springs back to its original shape.

Figure 37:
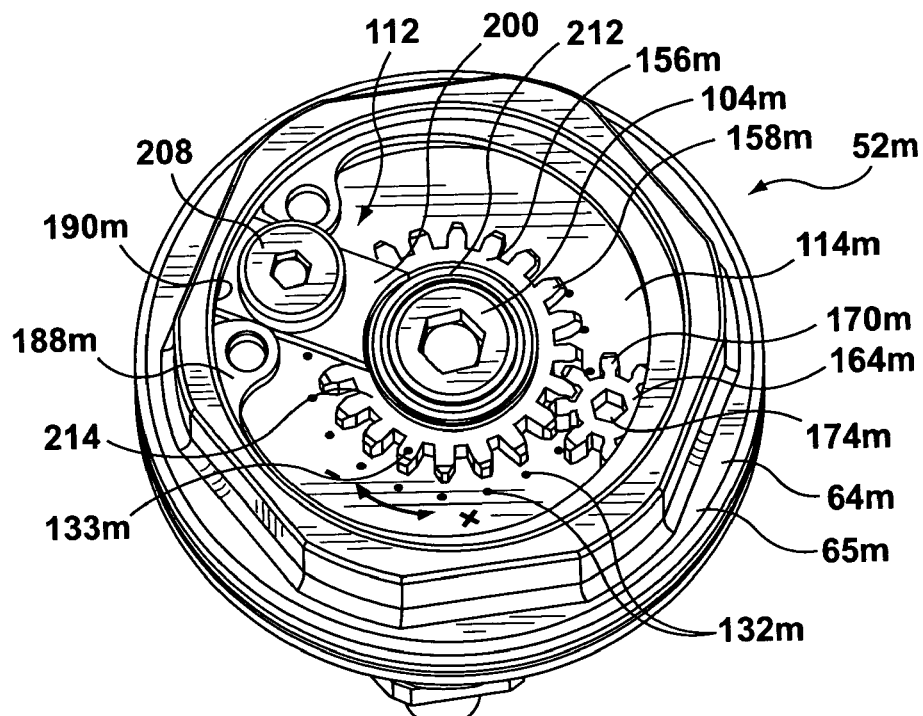
FIG. 37 is a top view of FIG. 36 in an unexploded view.

In the locked position, which is shown in FIG. 37, friction cam 200 rests against an upper surface 214 of main gear 156m. As fastener 208 is tightened, friction cam 200 provides downward pressure against upper surface 214 of main gear 156m, which provides frictional force to prevent rotation of main gear 156m. In the unlocked position, which is shown generally in FIG. 36, friction cam 200 is removed to allow main gear 156 to rotate with respect to piston 64m. In an alternative embodiment, friction cam 200 may be positioned so as to cause downward force on adjustment gear 164m rather than main gear 156m, such that adjustment gear 164m will not be able to revolve with respect to main gear 156m. In another alternative embodiment, an optional washer 212 may be provided adjacent an upper surface 214 of main gear 156m. First curved end 202 of friction cam 200 may be adjacent or may be fit under an outer edge of washer 212, such that first curved end 202 engages a portion of main gear 156m to further assist with preventing lateral or radial movement of friction cam 200.

An anti-rotation device 71m is provided in actuator 52m to keep valve pin 50m in consistent rotational alignment with the mold gate (not shown). In order to generally prevent rotation of connector 98m relative to a collar (not shown), anti-rotation device 71m includes a flat wall 99m of connector 98m, as discussed in detail in previous embodiments. In all other aspects, actuator 52m functions as previously described in one or more of the previous embodiments.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a manifold having a manifold melt channel;
   a nozzle having a nozzle melt channel in communication with said manifold melt channel;

a valve pin extending through said nozzle melt channel;
a valve pin actuator including a piston and an adjustment piece coupled to said piston, wherein said adjustment piece moves in an axial direction with respect to said piston and wherein said adjustment piece is coupled to said valve pin;
an anti-rotation device that inhibits rotational movement of said valve pin and said adjustment piece;
an indicator that measures movement of said adjustment piece in an axial direction with respect to said piston; and
a locking device that holds said adjustment piece in a fixed position with respect to said piston, said locking device being selectively removable from said actuator.

2. The injection molding apparatus of claim 1, wherein said adjustment piece includes a flange which is engaged by said locking device.

3. The injection molding apparatus of claim 2, wherein said flange is a shape having at least one corner and said locking device includes a plurality of teeth which engage said at least one corner of said flange when in a locked position.

4. The injection molding apparatus of claim 3, wherein said flange is square-shaped.

5. The injection molding apparatus of claim 3, wherein said flange is arrow-shaped.

6. The injection molding apparatus of claim 2, wherein said flange includes a first set of teeth and wherein said locking device includes a second set of teeth, which engage said first set of teeth when in a locked position.

7. The injection molding apparatus of claim 6, wherein said locking device includes an adjustment gear having said second set of teeth that engages said first set of teeth of said flange and a locking cam that engages one of said first and second set of teeth, when in a locked position.

8. The injection molding apparatus of in claim 1, wherein said adjustment piece is threaded to said piston.

9. The injection molding apparatus of claim 8, wherein rotational movement of said adjustment piece is limited to less than one full turn with respect to said piston.

10. The injection molding apparatus of claim 1, wherein said indicator includes gradation marks on one of said piston or said adjustment piece and a locating mark on the other of said piston and said adjustment piece, wherein movement of said locating mark with respect to said gradation marks represents a distance of movement in an axial direction of said valve pin corresponding to said movement of said adjustment piece with respect to said piston.

11. The injection molding apparatus of claim 1, wherein said valve pin is coupled to said adjustment piece via a connector.

12. The injection molding apparatus of claim 1, wherein said locking device includes a fastener which engages one of a plurality of apertures in said adjustment piece and a recess in said piston.

13. The injection molding apparatus of claim 1, wherein said indicator includes a plurality of apertures in said adjustment piece.

14. The injection molding apparatus of claim 1, wherein said locking device is a threaded bore in said adjustment piece through which a bolt is threaded and contacts an upper surface of said piston.

15. The injection molding apparatus of claim 1, wherein said locking device includes a generally flat cam fastened to said piston, wherein friction from downward pressure from said flat cam against said adjustment piece limits movement of said adjustment piece with respect to said piston.

16. An injection molding apparatus, comprising:
a manifold including a manifold melt channel;
a nozzle including a nozzle melt channel in communication with said manifold melt channel;
a valve pin driven by a piston of an actuator, wherein said actuator retracts and extends said valve pin towards a mold gate;
an adjustment piece that is movable in an axial direction with respect to said piston and that is coupled to said valve pin;
a locking device including a threaded bore in said adjustment piece, wherein a bolt is threadedly engaged with said threaded bore and said bolt selectively engages an upper surface of said piston to hold the adjustment piece from rotating with respect to said piston; and
an indicator of a first axial position of said adjustment piece with respect to said piston, said first axial position of said adjustment piece corresponding to a second axial position of said valve pin with respect to said mold gate.

17. The injection molding apparatus of claim 16, wherein said adjustment piece is rotatably movable with respect to said piston.

18. The injection molding apparatus of claim 16, wherein said indicator includes gradation marks on one of said piston and said adjustment piece and a locating mark of the other of said piston and said adjustment piece.

19. The injection molding apparatus of claim 16, wherein said piston and said adjustment piece are removable without moving said adjustment piece with respect to said piston and without removing a cylinder of said actuator.

20. The injection molding apparatus of claim 16, wherein said bolt engages one of a hole or a groove formed in said upper surface of said piston.

21. An injection molding apparatus, comprising:
a manifold including a manifold melt channel;
a nozzle including a nozzle melt channel in communication with said manifold melt channel;
a valve pin driven by a piston of an actuators, wherein said actuator retracts and extends said valve pin towards a mold gate;
an adjustment piece axially movable with respect to said piston, wherein said valve pin is coupled to said adjustment piece and said adjustment piece includes a first set of teeth; and
an indicator that indicates an axial position of said valve pin with respect to said mold gate; and
an adjustment gear rotatably coupled to an upper surface of said piston, wherein said adjustment gear includes a second set of teeth that engages said first set of teeth of said adjustment piece;
wherein rotation of said adjustment gear causes adjustment piece to rotate with respect to said piston to axially move said adjustment piece and said valve pin with respect to said piston.

22. The injection molding apparatus of claim 21, wherein said piston and said adjustment piece are removable without moving said adjustment piece with respect to said piston and without removing a cylinder of said actuator.

23. The injection molding apparatus of claim 21, wherein one of said first and said second set of teeth are removably locked in place by a rotatable locking cam.

24. The injection molding apparatus of claim 21, wherein said adjustment piece is coupled to said piston via a rotatable threaded connection.

25. The injection molding apparatus of claim 21, wherein one of said first and second set of teeth are removably locked by friction caused by a friction cam exerting downward pressure on one of said adjustment piece or said adjustment gear.

* * * * *

UNITED STATES PATENT AND TRADEMARK OFFICE
CERTIFICATE OF CORRECTION

PATENT NO.         : 7,347,684 B2
APPLICATION NO.    : 11/237886
DATED              : March 25, 2008
INVENTOR(S)        : Tabassi et al.

It is certified that error appears in the above-identified patent and that said Letters Patent is hereby corrected as shown below:

Remove column 14, line 46 to column 15, line 59 and replace as follows:

A rod seal 122i surrounds rod portion 84i of piston 64i. Rod seal 122i is provided to generally prevent leakage of hydraulic fluid or pneumatic air from the cylinder. A retaining ring 124i is provided to maintain rod seal 122i in place relative to the cylinder.

As is best shown in FIGS. 27, 28 and 31, a main gear 156i having a plurality of teeth 158i abuts an upper surface 160i of adjustment piece 88i. Main gear 156i is welded to adjustment piece 88i to allow rotation of main gear 156i to cause rotation of adjustment piece 88i with respect to piston 64i. Main gear 156i may alternatively be coupled to adjustment piece 88i by another suitable means. Main gear 156i further includes a bore 162i that is sized to allow a head 105i of fastener 104i to pass therethrough. One of the plurality of teeth 158i of main gear 156i includes a locating mark 133i for gauging movement of main gear 156i relative to gradation marks 132i, which are provided on upper end surface 114i of piston 64i. As indicated on upper end surface 114i, movement between adjacent gradation marks 132i is equal to an axial distance of 0.027 mm. It will be appreciated by a person skilled in the art that the amount of axial movement per gradation mark 132i may be adjusted to suit any application.

An adjustment gear 164i includes a shaft 166i, which is shown in FIG. 30, and a head 168i having a plurality of teeth 170i. Shaft 166i is received in a first aperture 172i, which is provided in upper end surface 114i of piston 64i, and is free to rotate. Adjustment gear 164i is located adjacent main gear 156i to allow teeth 170i of adjustment gear 164i to engage teeth 158i of main gear 156i so that rotation of adjustment gear 164i forces main gear 156i to rotate with respect to adjustment gear 164i, or adjustment gear 164i to revolve around main gear 156i. A tool-receiving recess 174i is provided in head 168i of adjustment gear 164i. Tool-receiving recess 174i allows an operator to rotate adjustment gear 164i using a suitable tool. In the embodiment shown, one full rotation of adjustment gear 164i causes main gear 156i to rotate about a half rotation.

UNITED STATES PATENT AND TRADEMARK OFFICE
CERTIFICATE OF CORRECTION

| | |
|---|---|
| PATENT NO. | : 7,347,684 B2 |
| APPLICATION NO. | : 11/237886 |
| DATED | : March 25, 2008 |
| INVENTOR(S) | : Tabassi et al. |

It is certified that error appears in the above-identified patent and that said Letters Patent is hereby corrected as shown below:

A locking gear assembly 192 is provided to selectively restrict rotation of adjustment gear 164i. As shown in FIG. 31, locking gear assembly 192 includes a locking gear 194 that is coupled to piston 64i by a screw 196. Screw 196 is received in a second aperture 198, which is provided in upper end surface 114i. A washer 200 is located between locking gear 194 and upper end surface 114i of piston 64i. Locking gear 194 includes a plurality of teeth 195, which can be seen in FIGS. 27 and 28, for engaging teeth 158i of main gear 156i. When screw 196 is loosened, locking gear 194 is free to rotate with main gear 156i and when screw 196 is tightened, locking gear 194 is restricted from rotating, which, in turn, restricts main gear 156i from rotating.

A retainer 188i is provided at the upper end of the piston 64i to restrict the distance that screw 196 of locking gear assembly 192 may be unscrewed and to maintain shaft 166i of adjustment gear 164i in first aperture 172i. Retainer 188i is received under a lip 190i of piston 64i, which is a fixed distance from locking gear assembly 192 and adjustment gear 164i. Retainer 188i is flexible so that it may be deformed for placement underneath lip 190i then once in position, retainer 188i springs back to its original shape. Retainer 188i generally functions to maintain both adjustment gear 164i and locking gear assembly 192 in engagement with piston 64i to prevent the small parts from coming loose and damaging other components in the injection molding apparatus.

As will be described, connector 98i rotates in a controlled manner with adjustment piece 88i and valve pin 50i rotates relative to mold gate (not shown), as this embodiment does not include an anti-rotation feature. As shown in FIGS. 29, 30 and 32, first end 100i of connector 98i includes a mating surface 202 having a slot 204. Slot 204 is sized to receive a projection 206, which extends from an end surface 102i of adjustment piece 88i. Engagement between slot 204 and projection 206 causes connector 98i to rotate along with adjustment piece 88i. Valve pin 50i also rotates with connector 98i and adjustment piece 88i because valve pin head 51i includes a flat surface 151i that prevents valve pin 50i from rotating within connector 98h.

UNITED STATES PATENT AND TRADEMARK OFFICE
CERTIFICATE OF CORRECTION

PATENT NO. : 7,347,684 B2
APPLICATION NO. : 11/237886
DATED : March 25, 2008
INVENTOR(S) : Tabassi et al.

It is certified that error appears in the above-identified patent and that said Letters Patent is hereby corrected as shown below:

It will be appreciated by a person skilled in the art that, in any of the previously described embodiments, the anti-rotation collar may be removed and slot 204 and projection 206 may be incorporated, as described with respect to FIGS. 27 to 32. Likewise, anti-rotation device 71 of the previous embodiments may be incorporated into the embodiment of FIGS. 27 to 32.

Signed and Sealed this

Thirty-first Day of March, 2009

JOHN DOLL
*Acting Director of the United States Patent and Trademark Office*